US012802457B2

(12) United States Patent
Fowe et al.

(10) Patent No.: US 12,802,457 B2
(45) Date of Patent: Nov. 17, 2026

(54) METHOD AND APPARATUS FOR COMPUTER-VISION-BASED OBJECT DETECTION

(71) Applicant: HERE Global B.V., Eindhoven (NL)

(72) Inventors: James Adeyemi Fowe, Chicago, IL (US); Bassel Sadek, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 509 days.

(21) Appl. No.: 17/990,399

(22) Filed: Nov. 18, 2022

(65) Prior Publication Data

US 2024/0169740 A1 May 23, 2024

(51) Int. Cl.

*G06V 20/58* (2022.01)
*G06V 10/26* (2022.01)
*G06V 10/764* (2022.01)
*G06V 20/56* (2022.01)

(52) U.S. Cl.

CPC .............. *G06V 20/58* (2022.01); *G06V 10/26* (2022.01); *G06V 10/764* (2022.01); *G06V 20/588* (2022.01)

(58) Field of Classification Search

CPC ...... G06V 20/58; G06V 10/26; G06V 10/764; G06V 20/588

See application file for complete search history.

(56) References Cited

U.S. PATENT DOCUMENTS

| | | | | |
|---|---|---|---|---|
| 10,955,855 | B1 * | 3/2021 | Tran | B60R 11/04 |
| 12,300,000 | B2 * | 5/2025 | Fowe | G06T 7/20 |
| 2010/0036562 | A1 * | 2/2010 | Becker | B60W 30/16 701/1 |
| 2010/0207787 | A1 * | 8/2010 | Catten | G08G 1/096716 340/905 |

(Continued)

FOREIGN PATENT DOCUMENTS

WO 2020146622 A1 7/2020

OTHER PUBLICATIONS

O. Kainz, F. Jakab, M. W. Horenčý and D. Cymbalák, "Estimating the object size from static 2D image," 2015 International Conference and Workshop on Computing and Communication (IEMCON), Vancouver, BC, Canada, 2015, pp. 1-5, doi: 10.1109/IEMCON.2015.7344423 (Year: 2015).*

(Continued)

*Primary Examiner* — Nancy Bitar

(74) *Attorney, Agent, or Firm* — DITTHAVONG, STEINER, & MLOTKOWSKI

(57) ABSTRACT

An approach is provided for computer-vision-based object detection. The approach involves, for example, receiving an image captured from a perspective of a vehicle or a device traveling at street level. The approach also involves processing the image using computer vision to detect one or more objects, one or more lane markings, a road surface, or a combination thereof depicted in the image. The approach further involves determining a relative positioning of the one (Continued)

or more objects with respect to the one or more lane markings, the road surface, or a combination thereof. The approach further involves classifying one or more semantic localization features of the one or more objects based on the relative positioning. The approach further involves providing the one or more semantic localization features as an output.

20 Claims, 19 Drawing Sheets

(56) References Cited

U.S. PATENT DOCUMENTS

| | | | | |
|---|---|---|---|---|
| 2015/0161881 | A1* | 6/2015 | Takemura | G06V 20/56 348/148 |
| 2018/0284785 | A1* | 10/2018 | Berntorp | B60W 60/00276 |
| 2019/0012551 | A1 | 1/2019 | Fung et al. | |
| 2019/0376809 | A1* | 12/2019 | Hanniel | G01C 21/3602 |
| 2019/0382007 | A1* | 12/2019 | Casas | B60W 60/0027 |
| 2020/0082561 | A1 | 3/2020 | Karonchyk et al. | |
| 2020/0086879 | A1* | 3/2020 | Lakshmi Narayanan | G06N 3/08 |
| 2020/0223437 | A1 | 7/2020 | Satou et al. | |
| 2021/0097408 | A1 | 4/2021 | Sicconi et al. | |
| 2021/0164787 | A1 | 6/2021 | Soni et al. | |
| 2021/0272310 | A1 | 9/2021 | Connell et al. | |

OTHER PUBLICATIONS

S. Nedevschi, "Accurate Ego-Vehicle Global Localization at Intersections Through Alignment of Visual Data With Digital Map," in IEEE Transactions on Intelligent Transportation Systems, vol. 14, No. 2, pp. 673-687, Jun. 2013, doi: 10.1109/TITS.2012.2228191 (Year: 2013).*

Y.-W. Seo and R. R. Rajkumar, "Utilizing instantaneous driving direction for enhancing lane-marking detection," 2014 IEEE Intelligent Vehicles Symposium Proceedings, Dearborn, MI, USA, 2014, pp. 170-175, doi: 10.1109/IVS.2014.6856467. (Year: 2014).*

S. Sivaraman and M. M. Trivedi, "Integrated Lane and Vehicle Detection, Localization, and Tracking: A Synergistic Approach," in IEEE Transactions on Intelligent Transportation Systems, vol. 14, No. 2, pp. 906-917, Jun. 2013, doi: 10.1109/TITS.2013.2246835. (Year: 2013).*

Ki, Yong-Kul. "Accident detection system using image processing and MDR." International Journal of Computer Science and Network Security IJCSNS 7, No. 3 (2007): 35-39. (Year: 2007).*

L. R. T. Horita and V. Grassi, "Employing a fully convolutional neural network for road marking detection," 2017 Latin American Robotics Symposium (LARS) and 2017 Brazilian Symposium on Robotics (SBR), Curitiba, Brazil, 2017, pp. 1-6, doi: 10.1109/SBR-LARS-R.2017.8215297 (Year: 2017).*

Wang et al., "Real-Time Lane Detection and alerts for Autonomous Driving", Jul. 4, 2018, 9 pages.

Notice of Allowance for related U.S. Appl. No. 17/990,420, dated Jan. 8, 2025, 9 pages.

* cited by examiner

800

820

900

1111

METHOD AND APPARATUS FOR COMPUTER-VISION-BASED OBJECT DETECTION

BACKGROUND

Mapping and navigation service providers are making increasing use of machine learning to provide location-based services. Machine learning, for instance, enables service providers to extract underlying spatial and/or semantic relationships between locations and to classify or make predictions based on those relationships or underlying structure. One particular area of interest is the use of computer vision to enable mapping and sensing of a vehicle's environment to support autonomous or semi-autonomous operations, for example, making inferences such as a construction zone, a pedestrian on the road, and/or the like. However, these real-time sensor data and inferred scene data are applied mainly for advanced driving assistance systems (ADAS) and vehicle-road cooperation thus requiring high-precision and resulted in tremendous amount of data. Accordingly, services providers face significant technical challenges with respect to real-time extracting useful and light-weighted information from the real-time sensor data and inferred scene data to support other location-based services, such as intelligent transportation systems.

SOME EXAMPLE EMBODIMENTS

Therefore, there is a need for a resource efficient approach for detecting and locating objects based on computer vision from images captured (e.g., by a dashcam or smartphone).

According to one embodiment, a method comprises receiving an image captured from a perspective of a vehicle or a device traveling at street level. The method also comprises processing the image using computer vision to detect one or more objects, one or more lane markings, a road surface, or a combination thereof depicted in the image. The method further comprises determining a relative positioning of the one or more objects with respect to the one or more lane markings, the road surface, or a combination thereof. The method further comprises classifying one or more semantic localization features of the one or more objects based on the relative positioning. The method further comprises providing the one or more semantic localization features as an output.

According to another embodiment, an apparatus comprises at least one processor, and at least one memory including computer program code for one or more computer programs, the at least one memory and the computer program code configured to, with the at least one processor, cause, at least in part, the apparatus to receive an image captured from a perspective of a vehicle or a device traveling at street level. The apparatus is also caused to process the image using computer vision to detect one or more objects, one or more lane markings, a road surface, or a combination thereof depicted in the image. The apparatus is further caused to determine a relative positioning of the one or more objects with respect to the one or more lane markings, the road surface, or a combination thereof. The apparatus is further caused to classify one or more semantic localization features of the one or more objects based on the relative positioning. The apparatus is further caused to provide the one or more semantic localization features as an output.

According to another embodiment, a non-transitory computer-readable storage medium carries one or more sequences of one or more instructions which, when executed by one or more processors, cause, at least in part, an apparatus to receive an image captured from a perspective of a vehicle or a device traveling at street level. The apparatus is also caused to process the image using computer vision to detect one or more objects, one or more lane markings, a road surface, or a combination thereof depicted in the image. The apparatus is further caused to determine a relative positioning of the one or more objects with respect to the one or more lane markings, the road surface, or a combination thereof. The apparatus is further caused to classify one or more semantic localization features of the one or more objects based on the relative positioning. The apparatus is further caused to provide the one or more semantic localization features as an output.

According to another embodiment, an apparatus comprises means for receiving an image captured from a perspective of a vehicle or a device traveling at street level. The apparatus also comprises means for processing the image using computer vision to detect one or more objects, one or more lane markings, a road surface, or a combination thereof depicted in the image. The apparatus further comprises means for determining a relative positioning of the one or more objects with respect to the one or more lane markings, the road surface, or a combination thereof. The apparatus further comprises means for classifying one or more semantic localization features of the one or more objects based on the relative positioning. The apparatus further comprises means for providing the one or more semantic localization features as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for machine learning (ML)-based estimated time of arrival (ETA) prediction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

As used herein, the term "object detection" refers to object classification and object localization. Object classification detects and classifies all objects in an image, and object localization finds where each object is in the image and draws a bounding box around the object's extent. Although various embodiments are described with respect to a road, it is contemplated that the approach described herein may be used with other paths such as a bicycle lane, a hiking trail, a sidewalk, an office hallway, a warehouse aisle, etc.

As used herein, the term "a semantic localization feature" refers to a category or label indicating a relative location (e.g., left, right, on or off road, etc.) instead of a precise location (e.g., location coordinates). It provides the advantage of simplifying the analysis when a precise location is not required.

Figure 1:
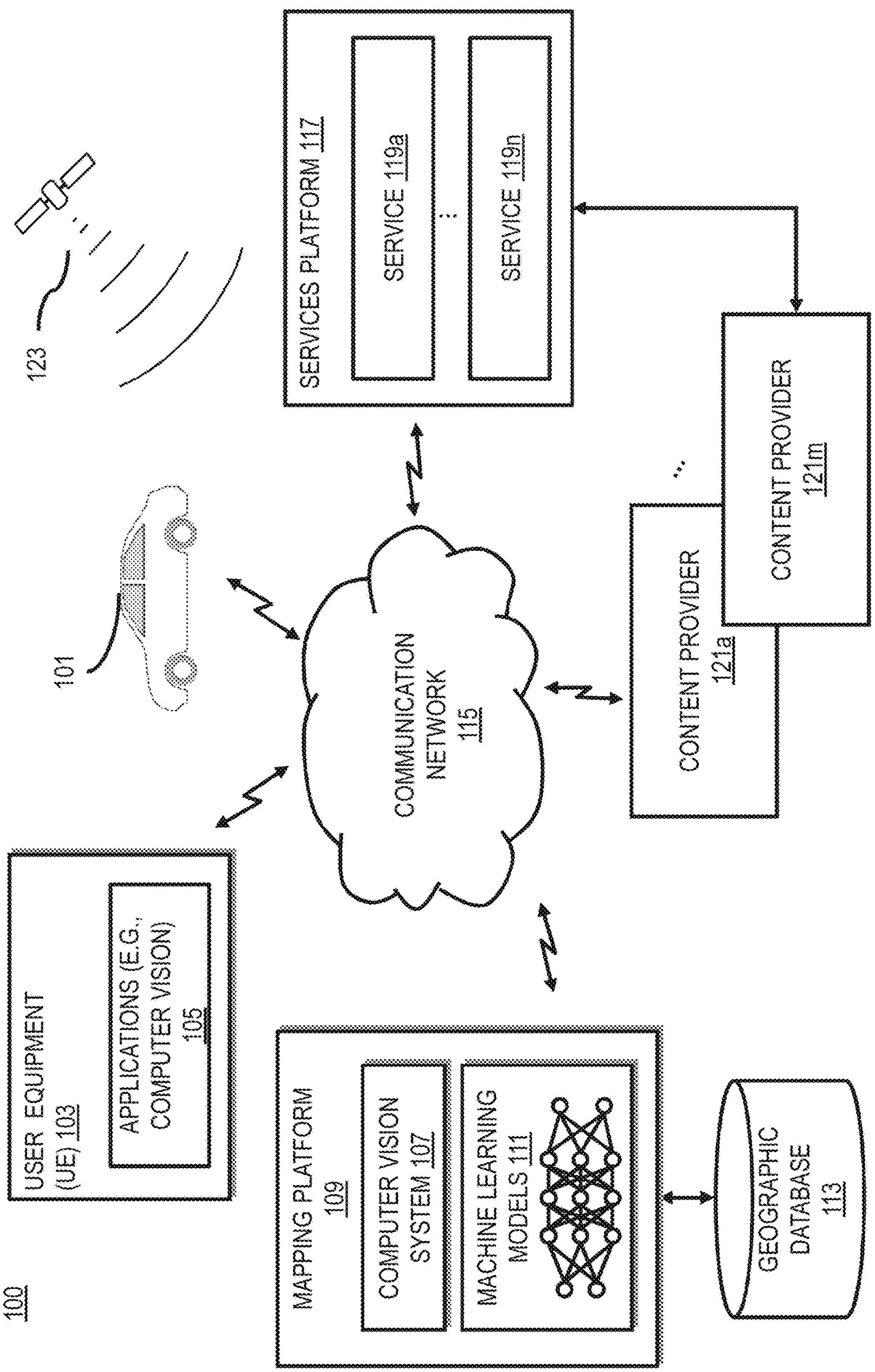
FIG. 1 is a diagram of a system capable of computer-vision-based object detection, according to example embodiment(s)

FIG. 1 is a diagram of a system capable of computer-vision-based object detection, according to example embodiment(s). As discussed above, machine learning has quickly become an area of intense interest for improving autonomous driving, with recent advances in computer vision and compute power enabling real-time mapping and sensing of a vehicle's environment. Such an understanding of the environment enables autonomous, semi-autonomous, or highly assisted driving in a vehicle (e.g., a vehicle 101).

Real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (e.g., traffic cones, dividers, lamp posts, etc.) and dynamic (e.g., kids, deer, etc.) obstacles, and these obstacles may change or appear in real-time. More fundamentally, vehicles 101 can use a semantic understanding of what areas around them are navigable and safe for driving. Most vehicle navigation systems provide localization based GPS and other sensor data (e.g., cameras, LiDAR, radar, ultrasonic sensors, etc.) to provide a localization accuracy of around 10 cm needed for safe driving in many areas. Among these sensors, camera is the cheapest and most widely available.

From the perspective of crowd-souring road ground truth data, the system 100 does not need the completely mapped data in high resolution. In one embodiment, the system 100 can extract light-weighted object data from a raw image captured by an imaging device (e.g., a dashcam, a smartphone camera, etc.) of a user equipment 103 using a computer vision system (e.g., an application 105 on the UE 103, a computer vision system 107 on a mapping platform 109, etc.). For instance, the system 100 can apply computer vision techniques to localize an object (e.g., a surrounding vehicle, construction cone, pedestrian, road barrier, etc.) with respect to the vehicle 101, a road surface, a lane on the road, etc., instead of its precise location (e.g., location coordinates), to reduce the data amount. Understanding the object's relative location enables planning of proper vehicle/driver reaction(s) and planning an efficient and safe route. By way of example, the vehicle 101 can make a lane change to avoid a coming traffic cone on a lane line marking a lane closure. Knowing this information is important for safe and timely driving maneuvers in complicated driving situations, and sometimes before they are visually obvious. In addition, the system 100 can output and/or publish such relative localization data incorporated with the vehicle location data to support other location-based services, such as traffic information services (reporting traffic areas, temporary road changes like construction, etc.), intelligent transportation systems (ITS), etc.

As the system 100 is based on computer vision executed by UEs 103 such as dashcams, smartphones, etc., it provides a wider coverages than autonomous vehicles, traffic cameras, security cameras, etc. For instance, a micro-mobility vehicle or pedestrian can carry a camera and/or smartphone into a vehicle-restricted area (e.g., a park, plaza, indoors (e.g., malls, museums, etc.), etc.) to detect traffic flows of micro-mobility vehicles, pedestrians, animals, etc. Micro-mobility vehicles include a range of small modes of transport for people and/or cargo, and driven autonomously (e.g., smart delivery bots) or by users personally (e.g., bicycles, e-bikes, electric scooters, electric skateboards, shared bicycles, electric pedal assisted bicycles, etc.). Therefore, the system 100 can potentially include every portable camera a vision sensor for the location-based services, to extract object types and relative locations and/or infer dynamic events real-time in order to publish traffic and dynamic contents.

Figure 2A:
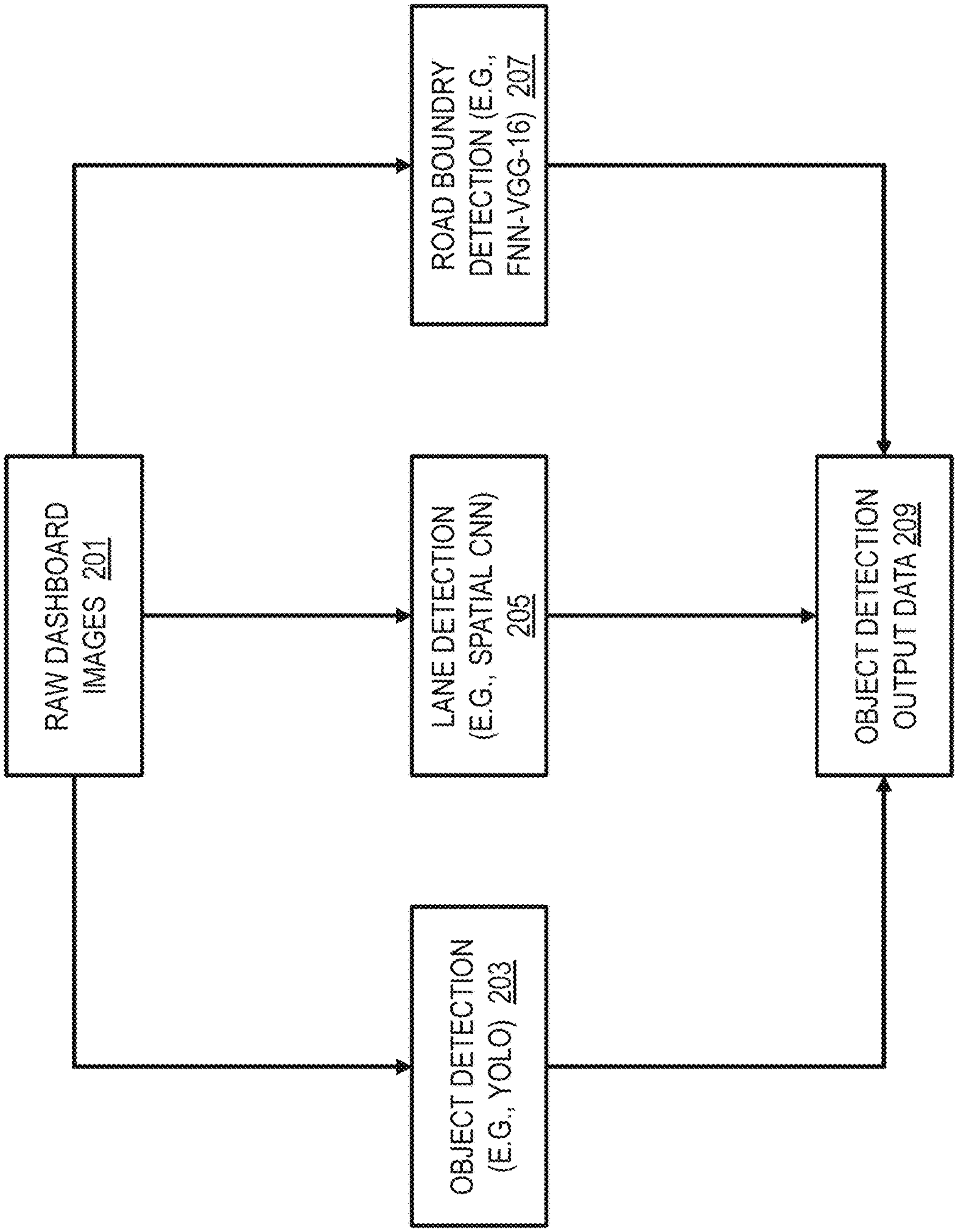
FIG. 2A is a diagram illustrating an example computer-vision-based object detection process, according to example embodiment(s)

FIG. 2A is a diagram illustrating an example computer-vision-based object detection process, according to example embodiment(s). In one embodiment, the system 100 can apply a computer-vision-based object detection system (e.g., the computer vision system 107) on one or more raw dashboard images 201 (e.g., a raw image 221 in FIG. 2B) using an object detection algorithm 203 (e.g., You Only Look Once (YOLO)) to detect the one or more objects, a lane detection algorithm 205 (e.g., a spatial connected neural network (CNN) model) to detect the one or more lane markings, a road boundary detection algorithm 207 (e.g., a fully convolutional neural network (FCNN)-VGG16) to detect the road surface, etc., to generate an object detection output data 209 for example, including semantic localization feature(s).

For instance, the system 100 and/or the computer-vision-based object detection system can apply the algorithms for object detection by training it with different types of objects, such as a construction cone, a pedestrian, another vehicle, etc., to detect object context such as a relative positioning of an object with respect to the vehicle 101 (e.g., left or right), a road surface the vehicle 101 is travelling one (e.g., one or off the road), one or more lane markings on the road surface (e.g., on or not on the same lane as the vehicle 101), etc. The system 100 can use such object context to relatively localize the object on a map, and to determine dynamic traffic impacting events, such as a road traffic volume (e.g., using cars detection), roadworks (e.g., using cones detection), etc.

Figure 2B:
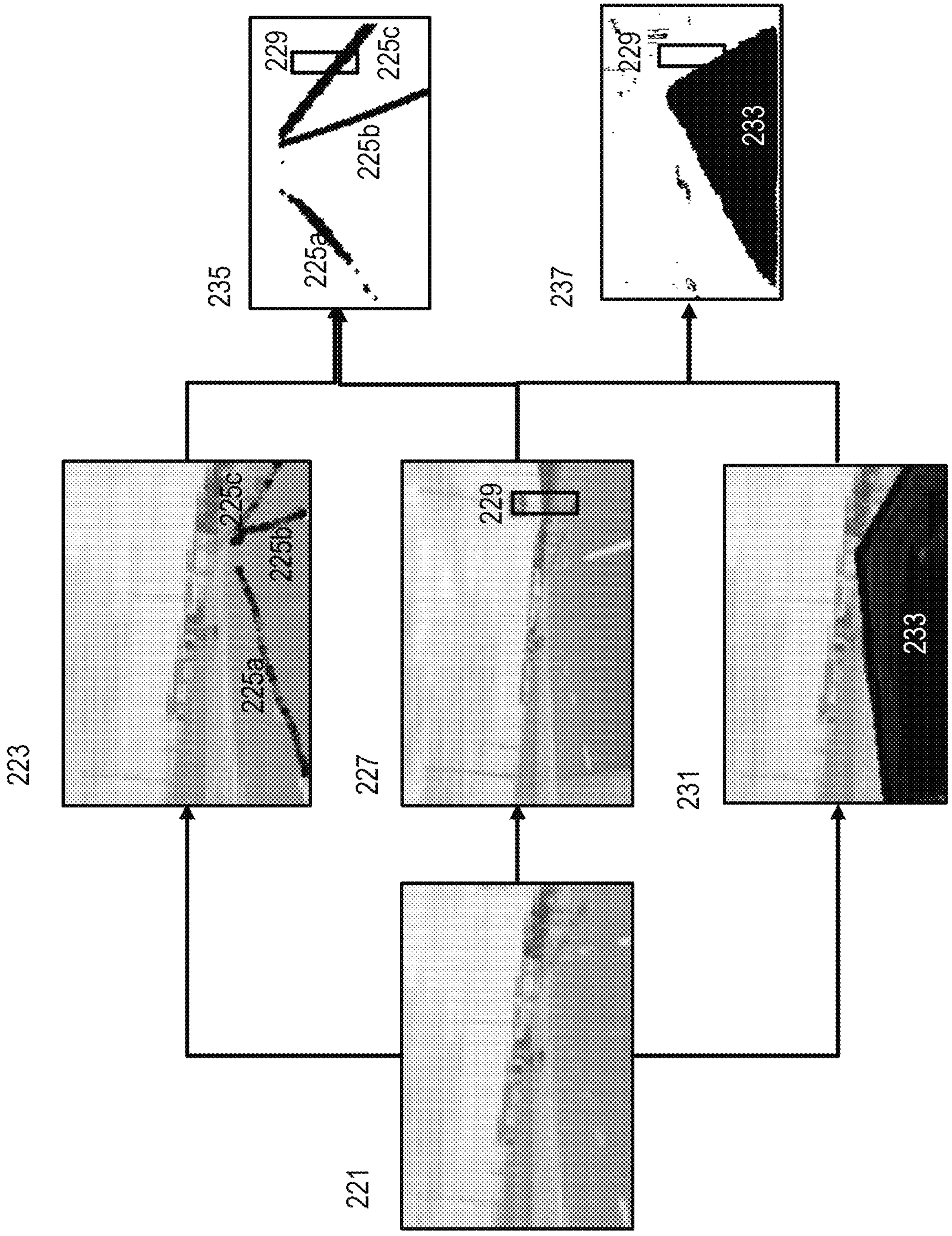
FIG. 2B is a diagram illustrating example outputs of the algorithms of the computer-vision-based localization process, according to example embodiment(s)

FIG. 2B is a diagram illustrating example outputs of the algorithms 203-207 of the computer-vision-based localization process, according to example embodiment(s). For instance, the vehicle 101 or the UE 103 is equipped with an imaging device (e.g., a dashcam, a smartphone camera, etc.) that employs one or more embodiments as described herein. In this example, the raw image 221 has been captured then processed via the algorithms 203-207 respectively.

In one embodiment, the lane detection algorithm 205 can apply common approaches of road lane detection involving Hough Transform, Canny edge detection with Hough, Hue, saturation, and value (HSV) & Region-of-Interest (ROI), CNN, etc. The lane detection algorithm 205 can extract lane marking features to detect lane lines, and/or extract vehicle trajectory features to detect lanes.

For instance, the lane detection algorithm 205 applies a spatial CNN model on the raw image 221 to extract pixel features of each lane line, and then fit the extracted features to detect all traffic lanes observed in the raw image 221 and output a set of pixel coordinates for each detected lane. The lane detection algorithm 205 can use the output to generate an image 223 overlaid with detected lane markings 225*a*-225*c*. In another embodiment, the lane detection algorithm 205 does not depend on any infrastructure support such as lane markings, and works even when there are no lane markings, by extracting vehicle trajectories traveling on roads in developing regions.

In one embodiment, the object detection algorithm 203 can employ CNNs to detect objects in real-time, such as YOLO, Region-Based Convolutional Neural Networks (R-CNN), etc. For instance, the object detection algorithm 203 applies YOLO on the raw image 221 to draw rectangular bounding boxes around detected objects and outputs the pixel coordinates of the bounding boxes along with a confidence probability of the detected object. YOLO requires only one single forward propagation through a neural network to detect all objects in a frame of various class probabilities and set bounding boxes simultaneously. As such, YOLO is rapid and it can detect objects in real-time on live video streams at about 65 frame per second (FPS). The object detection algorithm 203 can use the output to generate an image 227 overlaid with one or more object bounding boxes (e.g., a bounding box 229 around a traffic cone). In another embodiment, the object detection algorithm 203 further labels on the bounding box an object class, pixel coordinates, and/or a predicted confidence score. As another instance, the object detection algorithm 203 can employ R-CNNs using multiple passes on an image for each object present.

In one embodiment, the road boundary detection algorithm 207 can apply activity-driven, feature-driven, and/or model-driven approaches to detect road boundaries, such as identifying textural differences between road and non-road regions, classifying image pixels as belonging or not to a road surface based on colors, etc. For instance, the road boundary detection algorithm 207 applies FCN-VGG16 on the raw image 221 to classify each pixel there in as classify yes or no pavement, so as to detect a road region and/or road boundaries, and the generate an image 231 overlaid with a road region/boundary mask 233. VGG16 is an object detection algorithm consisting of 16 layers (including 13 convolutional layers and 3 fully connected layers) followed by a SoftMax classifier. VGG16 can classify 1000 images of 1000 different categories with 92.7% accuracy. For instance, the system 100 feeds the raw image 221 of 224×224×3 as input into FCNN-VGG16, and the convolutional layers compress the 224×224×3 image into 7×7×512 (i.e., 25,088 features). These features are then fed to the fully connected layers to obtain a 1K-dimensional feature vector. The system 100 can get an output of pixels of the road payment based on the feature vector. Such image segmentation based road surface detection can classify each pixel in the image belongs to a road pavement or not, and produce a "cut out" that follows a contour of the road pavement.

The system 100 then can apply geometric techniques to the outputs of the algorithms 203-207 to determine: (1) where is a detected object located relative to the lane of a reference vehicle (e.g., the vehicle 101)? And (2) is the detected object on the same road traversed by the reference vehicle?

In one embodiment, to answer the (1) question, the system 100 can combine the outputs of both the YOLO object detection algorithm and the spatial CNN traffic lane detection into an image 235. For instance, to determine whether a detected object is to the left, to the right, or on the same lane as the reference vehicle, the system 100 can identify which detected lanes/lane lines are the left and right lanes/lane lines of the reference vehicle. This left/right classification can be accomplished by classifying all lanes/lane lines as being either a left lane/lane line or a right lane/lane line relative to the location of the reference vehicle. In one embodiment, the system 100 can classify lanes/lane lines by fitting a first-degree polynomial into the set of pixel coordinates (xi, yi), i=1 . . . n of a particular traffic lane and extracting the slope of the first-degree polynomial. The slope can be calculated using Equation 1:

$$\text{slope} = \frac{\sum_{i=1}^{n}(x_i - \overline{x})(y_i - \overline{y})}{\sum_{i=1}^{n}(x_i - \overline{x})^2} \quad (1)$$

where $\overline{x}$ and $\overline{y}$ are the mean of x and y coordinates of the traffic lane, respectively.

Once the traffic lanes/lane lines are classified into left and right, the system 100 can determine the left and right boundaries of the lane that the reference vehicle is traveling on based on Equations 2 and 3, respectively.

$$\text{Left} = \underset{i}{\arg\max}\left(\min\left(x_{left_1}\right), \min\left(x_{left_2}\right), \ldots \min\left(x_{left_i}\right), \ldots\right), \quad (2)$$

$$\text{Right} = \underset{i}{\arg\max}\left(\max\left(x_{right_1}\right), \max\left(x_{right_2}\right), \ldots \max\left(x_{right_i}\right), \ldots\right) \quad (3)$$

where $x_{left_i}$ is the set of x-coordinates of the left lane/lane line with index i, and $x_{right_i}$ is the set of x-coordinates of the right lane/lane line with index i.

In one embodiment, to determine a lateral location of the detected object relative to the reference vehicle, the system 100 can compare the x-coordinate of the centroid of the object bounding box with the x-coordinates of both lane boundaries as observed at the same y-coordinate of the bounding box centroid. In other words, the system 100 can project the object bounding box centroid horizontally onto the two lanes boundaries, and record the x-coordinate at the points of intersection. For instance, to determine whether a detected object is to the left, to the right, or on the same lane as the reference vehicle, the system 100 can identify which detected lane/lane lines closest to the object is a left or right lane of the reference vehicle.

To answer the (2) question pertaining to whether a detected object is on/off road, the system 100 can combine the outputs of both the YOLO object detection algorithm and the FCN-VGG16 road boundary detection algorithm into an image 237.

In one embodiment, the system 100 can determine the left and right boundaries of the road by looping over the rows of the road pavement detections, and extracting for each row the first and last occurrence of a road pavement detection (as moving from left to right across the columns). The set of first occurrences from all rows represents the left road boundary and the set of last occurrences from all rows represents the right road boundary. Then, for each detected object, the system 100 can compare the x-coordinate of the object bounding box centroid, to the projected x-coordinate of the road boundaries. If the x-coordinate of the object bounding box centroid is within the x-coordinates of the road boundaries, then the object is classified as 'On Road'. Otherwise, the object is classified as "Off Road".

The system 100 and/or other location-based service providers can crowd-source such light-weight object detection data for traffic processing, incident detection, road monitoring, and/or other location-based services.

Figure 3:
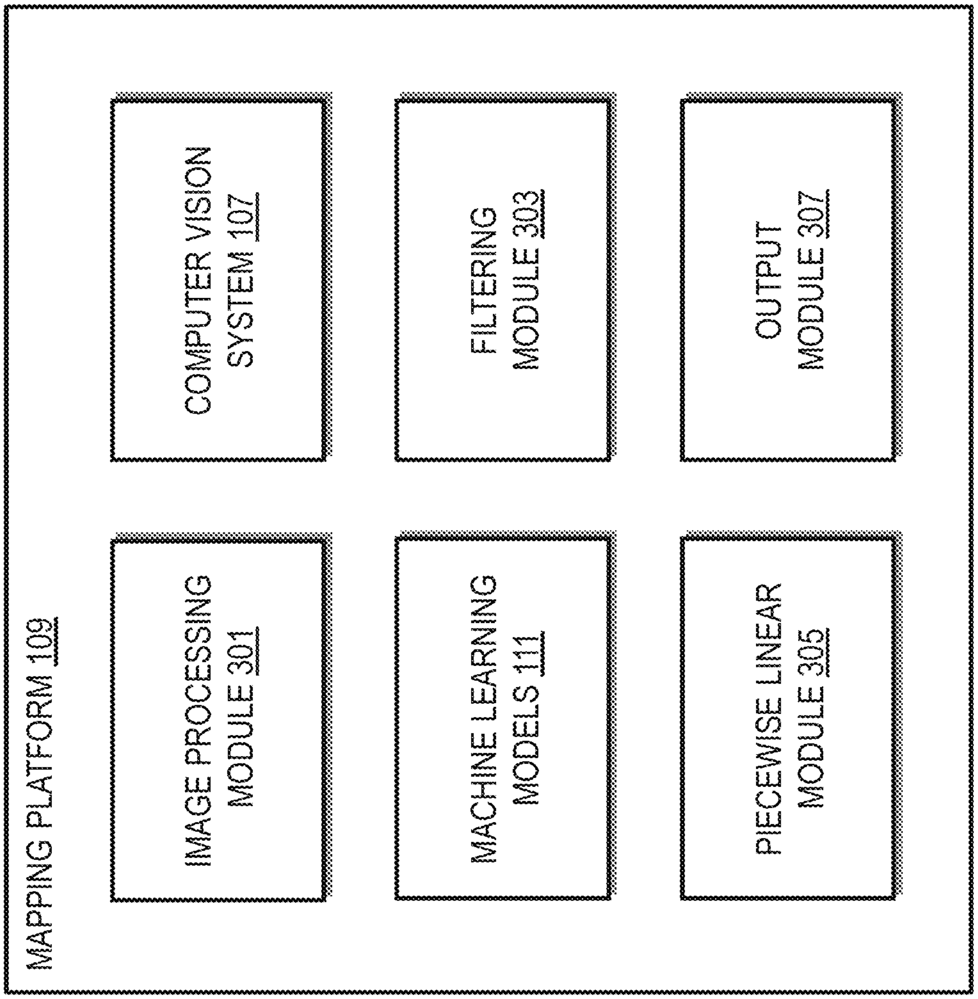
FIG. 3 is a diagram of components of a mapping platform capable of providing a computer-vision-based object detection, according to example embodiment(s)

FIG. 3 is a diagram of components of a mapping platform capable of providing a computer-vision-based object detection, according to example embodiment(s). In one embodiment, as shown in FIG. 3, the mapping platform 109 of the system includes one or more components for computer-vision-based object detection according to the various embodiments described herein. It is contemplated that the functions of the components of the mapping platform 109 may be combined or performed by other components of equivalent functionality. As shown, in one embodiment, the mapping platform 109 includes an image processing module 301, the computer vision system 107, one or more machine learning models 111, a filtering module 303, a piecewise linear module 305, and an output module 307. The above presented modules and components of the mapping platform 109 can be implemented in hardware, firmware, software, circuitry, or a combination thereof. Though depicted as a separate entity in FIG. 1, it is contemplated that the mapping platform 109 may be implemented as a module of any of the components of the system (e.g., services platform 117, one or more services 119*a*-119*n* (also collectively referred to as services 119), one or more content providers 121*a*-121*m* (also collectively referred to as content providers 121), vehicles 101, UEs 103, and/or the like). In another embodiment, one or more of the modules or components of the mapping platform 109 may be implemented as a cloud-based service, local service, native application, or combination thereof.

Figure 4:
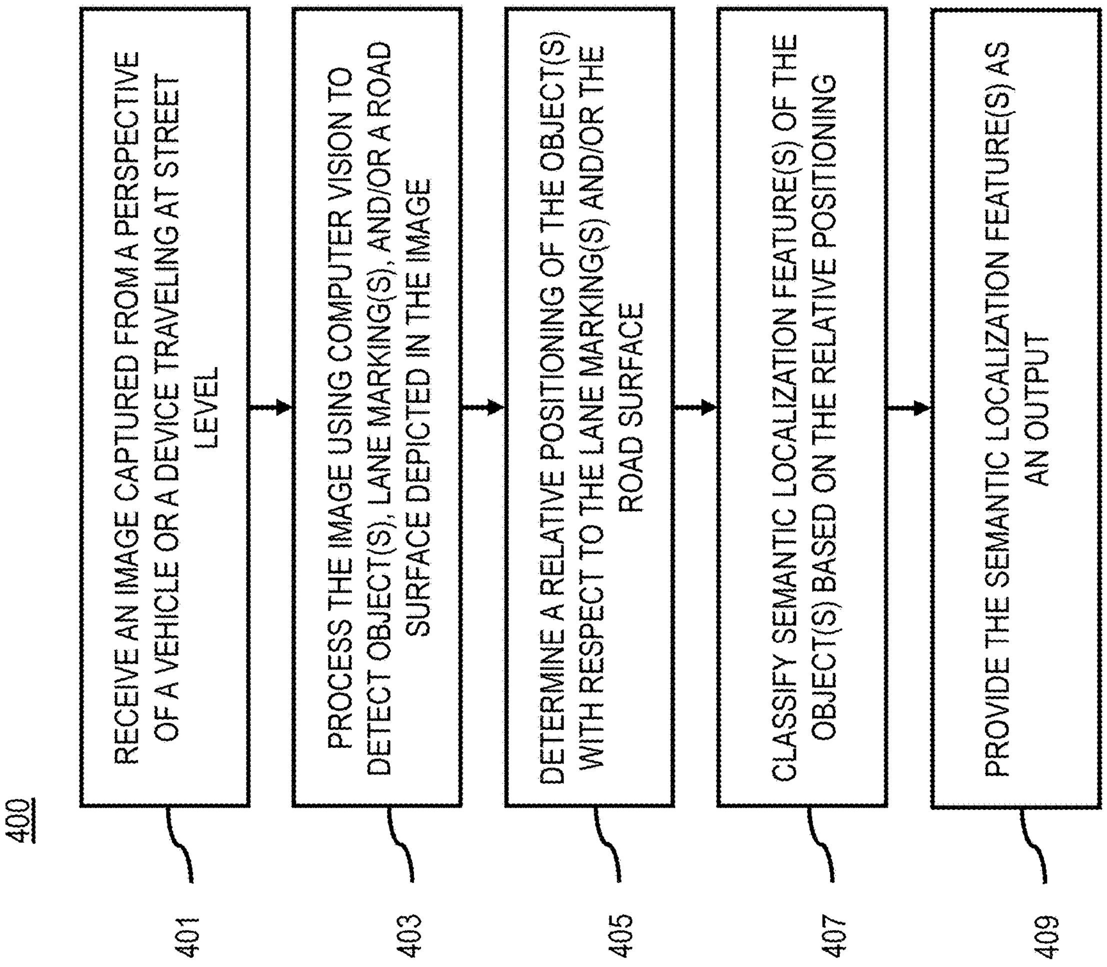
FIG. 4 is a flowchart of a process for providing a computer-vision-based object detection, according to example embodiment(s)
Figure 14:
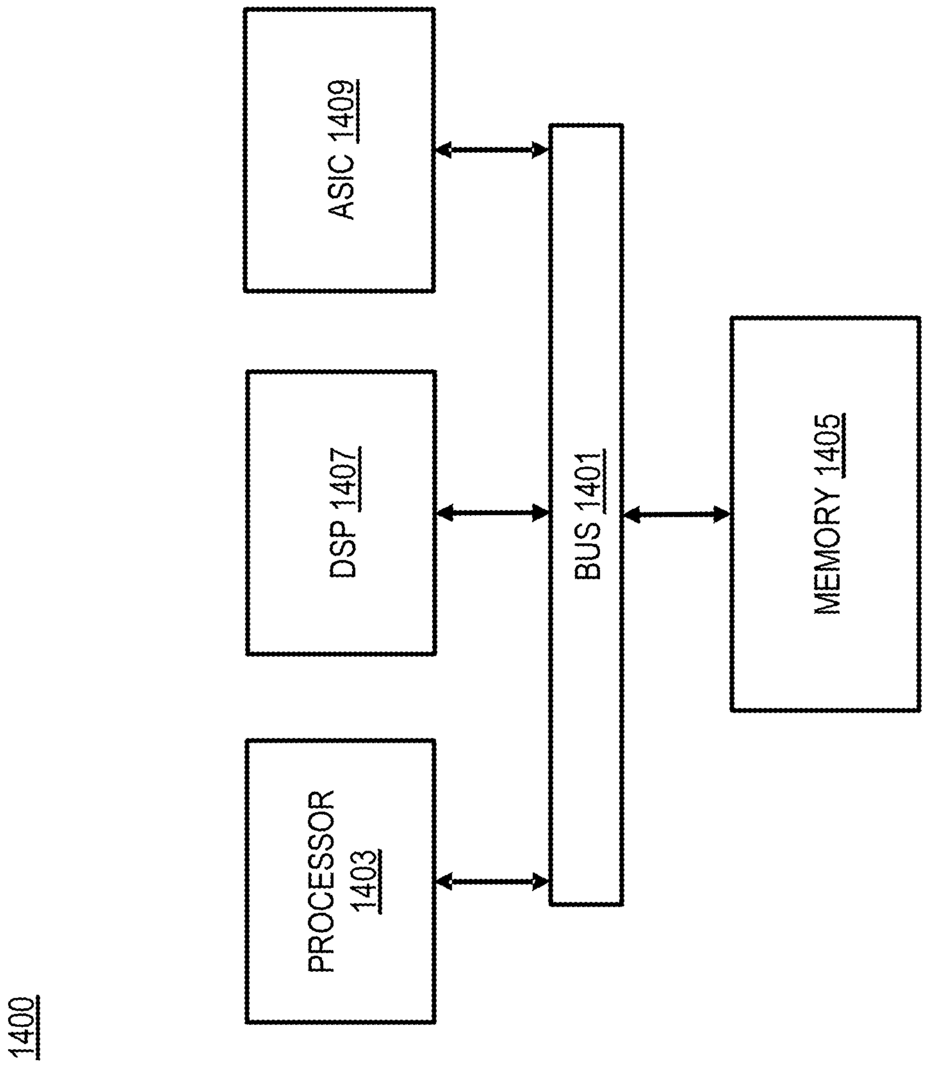
FIG. 14 is a diagram of a chip set that can be used to implement an embodiment of the invention, according to example embodiment(s)

FIG. 4 is a flowchart of a process 400 for providing a computer-vision-based object detection, according to example embodiment(s). In various embodiments, the computer vision application on UE 103, the mapping platform 109, and/or any of their modules/components may perform one or more portions of the process 400 and may be implemented in, for instance, a chip set including a processor and a memory as shown in FIG. 14. As such, the computer vision application on UE 103, the mapping platform 109 and/or any of their components/modules can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In one embodiment, for example, in step 401, the image data processing module 301 can receive an image (e.g., the raw image 221 in FIG. 2B) captured from a perspective of a vehicle (e.g., the vehicle 101) or a device (e.g., the UE 103) traveling at street level.

In one embodiment, in step 403, the computer vision system 107 can process the image using computer vision (e.g., the process depicted in FIG. 2A) to detect one or more objects (e.g., a traffic cone in the image 225 in FIG. 2B), one or more lane markings (e.g., in the image 223 in FIG. 2B), a road surface (e.g., in the image 227 in FIG. 2B), or a combination thereof depicted in the image. For instance, the computer vision can use an object detection algorithm (e.g., the object detection algorithm 203) to detect the one or more objects, uses a spatial neural network (e.g., the lane detection algorithm 205 using a spatial CNN model) to detect the one or more lane markings, uses an image segmentation classifier (e.g., the road boundary detection algorithm 207) to detect the road surface; or a combination thereof.

In one embodiment, in step 405, the computer vision system 107 can determine a relative positioning of the one or more objects with respect to the one or more lane markings (e.g., lateral location—left or right lane relative to vehicle, same lane or not, etc. as discussed below), the road surface (e.g., on/off road), or a combination thereof.

In-Lane Detection

In one embodiment, the one or more semantic localization features can include an in-lane detection, and the in-lane detection can indicate that the one or more objects are in a same lane or not the same lane as a location of the vehicle or the device. In this case, the computer vision system 107 can process the same as in the lateral localization, using criteria of which lane is intersected to determine whether something in in the left, right, or same lane. For instance, the computer vision system 107 determine a vertical location of the one or more objects in the image, project a horizontal line from the vertical location to one or more lane boundaries determined from the one or more lane markings, and determine the in-lane detection of the one or more objects based on an intersection of the horizontal line with the one or more lane boundaries.

In one embodiment, in step 407, the computer vision system 107 can classify one or more semantic localization features of the one or more objects based on the relative positioning. For instance, the one or more semantic localization features can include a lateral localization of the one or more objects with respect to the vehicle.

Figure 5:
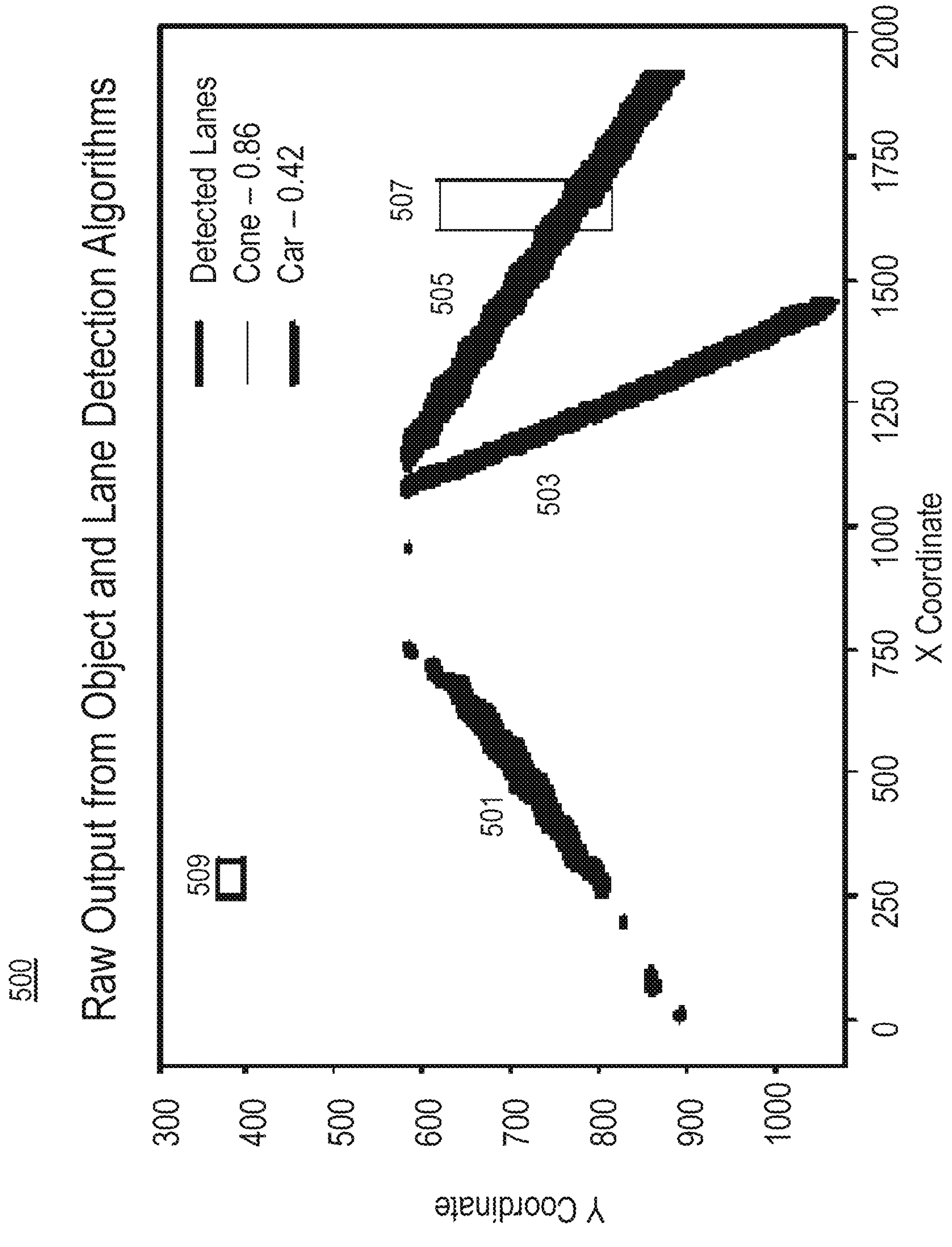
FIG. 5 is a diagram illustrating raw outputs from object and lane detection algorithms, according to example embodiment(s)

The lateral localization can indicate that the one or more objects are in a left lane or a right lane relative to a location of the vehicle or the device (e.g., the image 229 in FIG. 2B). FIG. 5 is a diagram 500 illustrating raw outputs from object and lane detection algorithms, according to example embodiment(s). The diagram 500 includes an enlarged image of the image 229 to show more details. For instance, the diagram 500 shows three sets of lane/lane line data points 501, 503, 505, a traffic cone in another bounding box 507 with a confidence probability of 0.86, a car in one bounding box 509 with a confidence probability of 0.42 in the image of 1-2000 pixel coordinates on the x-axis and 300-1000 pixel coordinates on the y-axis.

As shown in FIG. 5, some detected objects (such as the detected car) can be too far ahead from the reference vehicle to be detected and localized accurately. Hence, the filtering module 303 can filter out objects with a low confidence probability (e.g., <0.5). In one embodiment, the filtering module 303 can determine a relative size of the one or more objects based on an object pixel size of the one or more objects relative to an image pixel size of the image (e.g., using a Relative Object Size (ROS) metric), and filter the one or more objects based on the relative size.

For instance, the object pixel size can be determined from a size of a bounding box (e.g., determined via YOLO, Single-Shot Multi-box Detection (SSD), etc.) corresponding to the one or more objects as detected by the computer vision (e.g., via the object detection algorithm 203), as shown in Equation 4:

$$ROS = \frac{\text{Area of Object}}{\text{Area of Image}} = \frac{|(x_2 - x_1)(y_2 - y_1)|}{Img.\text{height} \times Img.\text{ width}} \quad (4)$$

where $x_i$ and $y_i$ are x and y coordinates of bounding box i, respectively.

After the filtering, the computer vision system 107 can determine whether the remaining object(s) (e.g., the traffic cone) are to the left, to the right, or on the same lane as the reference vehicle. As discussed, the computer vision system 107 can identify which detected lanes/lane lines are the left and right lanes of the reference vehicle using the slope Equation (1). Once the lanes/lane lines have been classified into left and right, the computer vision system 107 can determine the left and right boundaries of the reference vehicle lane using Equations (2)-(3), respectively.

Figure 6:
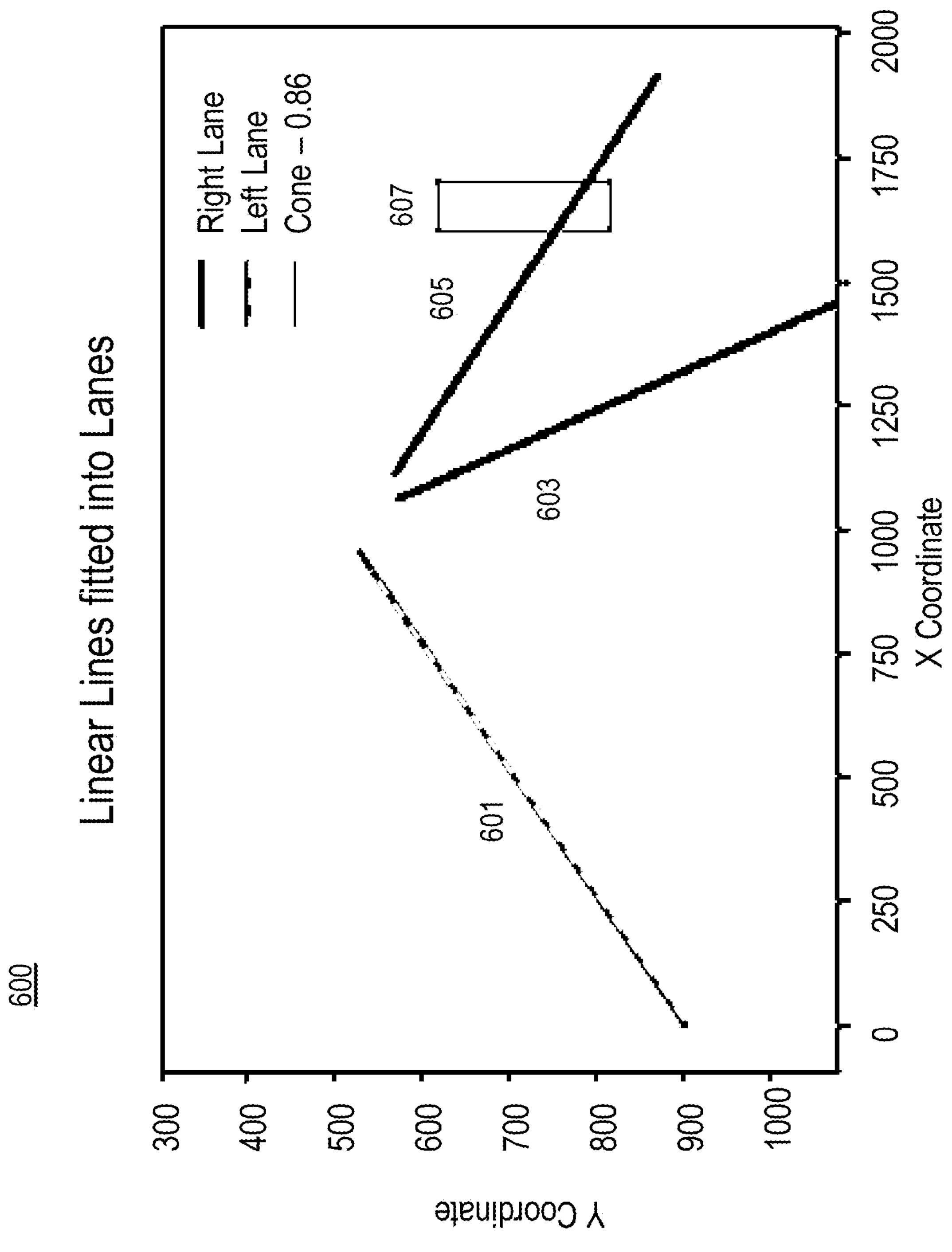
FIG. 6 is a diagram illustrating outputs from piecewise linear fitting, according to example embodiment(s)

After obtaining the left and right boundaries of the reference vehicle lane, the computer vision system 107 can fit a piecewise linear function into the pixel coordinates of each boundary. The purpose of using a piecewise linear function is to account for the fact that sometimes the lane boundaries can be non-linear, particularly at curvy roads. In addition, the use of piecewise linear functions allows the computer vision system 107 to obtain a more accurate functional representation of the lane boundaries. In one embodiment, the breakpoints of the piecewise linear functions can be determined in an iterative manner to minimize squared errors between the functions and the actual pixel coordinates. FIG. 6 is a diagram 600 illustrating outputs from piecewise linear fitting, according to example embodiment(s).

The diagram 600 shows one left lane/lane line 601 (e.g., in a broken line) and two right lanes/lane lines 603, 605 (e.g., in solid lines), the traffic cone in the bounding box 607 with a confidence probability of 0.86 in the image of 1-2000 pixel coordinates on the x-axis and 300-1000 pixel coordinates on the y-axis.

Figure 7:
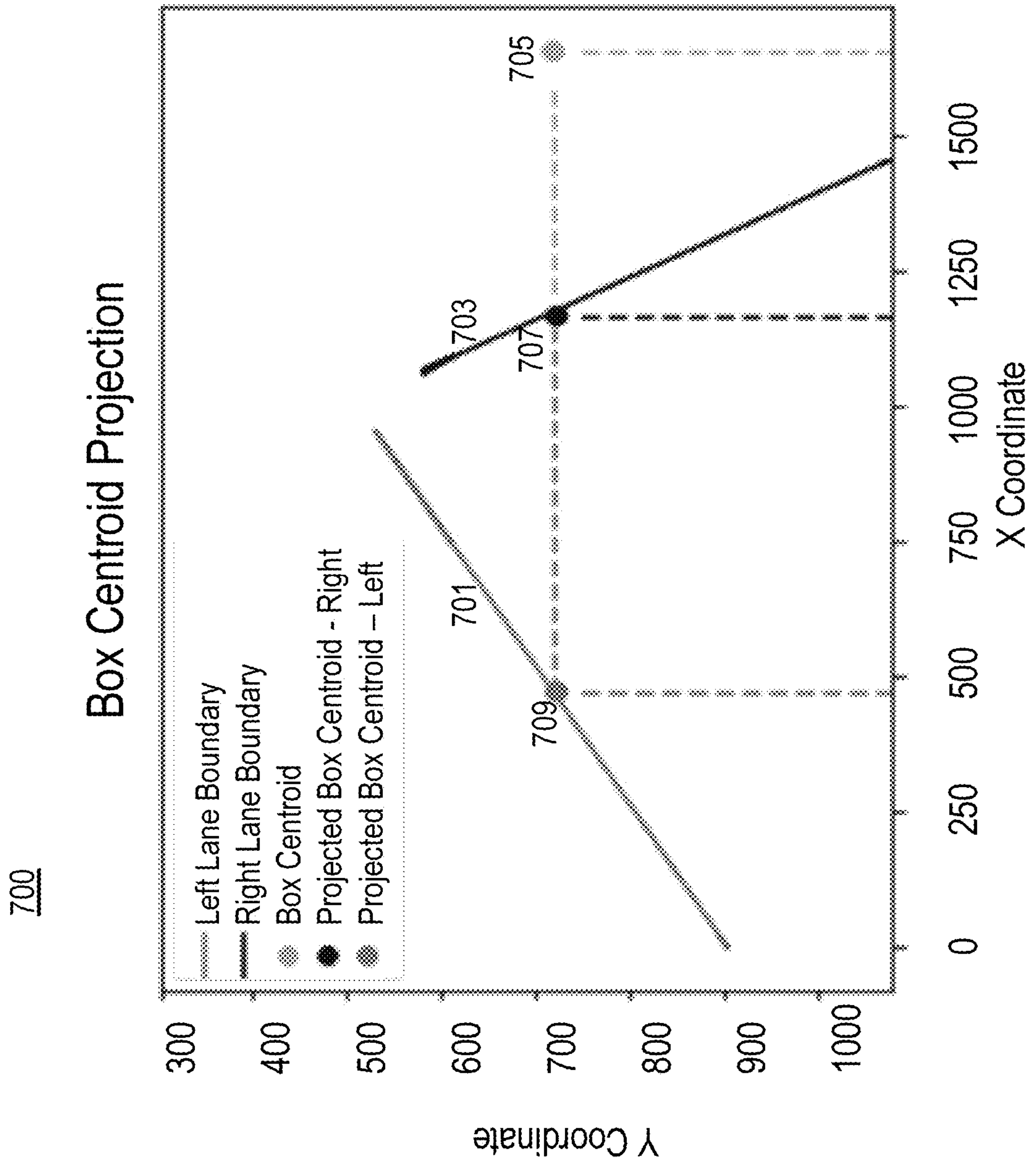
FIG. 7 is a diagram illustrating outputs from box projection, according to example embodiment(s)

In one embodiment, the computer vision system 107 can determine the lateral location of the detected object relative to the reference vehicle, using a box centroid projection approach. FIG. 7 is a diagram 700 illustrating outputs from box projection, according to example embodiment(s). For instance, the computer vision system 107 can determine a vertical location (e.g., $y_i$=680) of the one or more objects (for example, the remaining object(s) after the filtering, such as the traffic cone) in the image, project a horizontal line (e.g., in parallel with the x-axis of the diagram) from the vertical location to one or more lane boundaries determined from the one or more lane markings, and determine the lateral location of the one or more objects based on an intersection of the horizontal line with the one or more lane boundaries (e.g., right and left projected box centroids).

In one embodiment, the computer vision system 107 can execute the horizontal projection by obtaining the piecewise linear function (slope and y-intercept) for which the y-coordinate of the bounding box falls within. Then, the x-coordinate at which intersection occurs is given by Equation (5):

$$x_{proj-k} = \frac{y_{bb} - \text{intercept}}{\text{slope}} \tag{5}$$

Where $y_{bb}$ is the y-coordinate of the object bounding box centroid, $x_{proj-k}$ is the x-coordinate of the projected point onto lane k, and the slope is determined using Equation (1). In one embodiment, the computer vision system 107 can determine a lateral location c based on the following logic: (1) if the $x_{proj-k} > x_{bb}$, the object is classified as left, (2) if $x_{proj-right} < x_{bb}$, the object is classified as right, (3) else the object is classified as on the same lane as the reference vehicle.

In FIG. 7, the diagram 700 shows a left lane boundary 701, a right lane boundary 703, a traffic cone bounding box centroid 705, a right projected box centroid 707 on the right lane boundary 703, a left projected box centroid 709 on the left lane boundary 701, and their respective x pixel coordinates (e.g., 1700, 1200, 470). As the traffic cone is located right side of the right lane boundary 703, it is determined as on the right side of the reference vehicle lane.

On/Off Road Detection

Figure 8A:
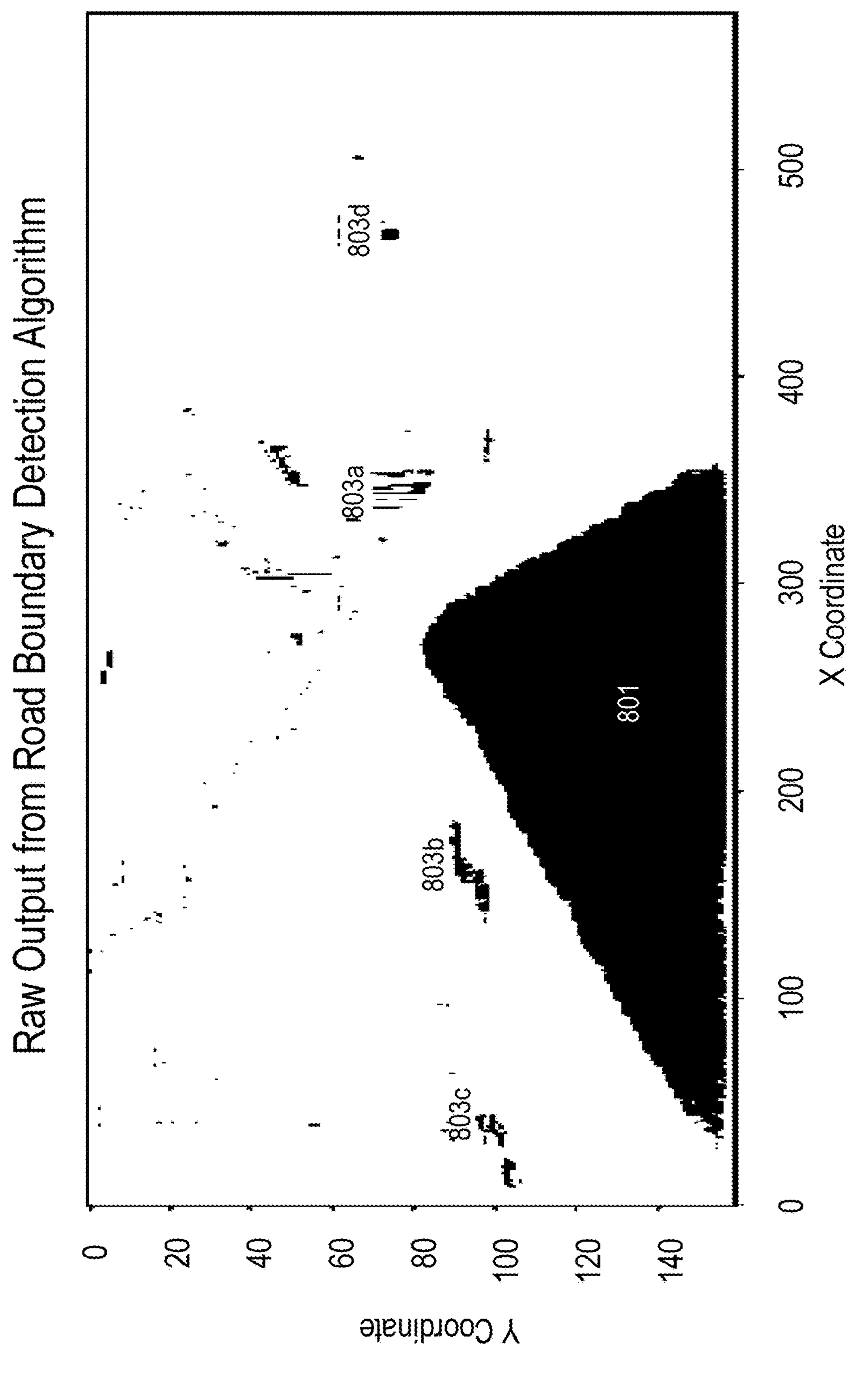
FIG. 8A is a diagram illustrating raw outputs from a road boundary detection algorithm, according to example embodiment(s)

In another embodiment, the one or more semantic localization features can include an on/off road detection, and the on/off road detection (e.g., the image 231 in FIG. 2B) can indicate that the one or more objects are on the road surface detected in the image or off the road surface detected in the image. FIG. 8A is a diagram 800 illustrating raw outputs from a road boundary detection algorithm, according to example embodiment(s). For instance, the diagram 800 shows road pavement data points with noise data points in the image of 1-600 pixel coordinates on the x-axis and 0-160 pixel coordinates on the y-axis.

As can be noted from FIG. 8A, the output from the road boundary detection algorithm 207 can be a bit noisy (e.g., detecting sparse pixel coordinates as road pavement, when there is no pavement observed at those pixel coordinates). In FIG. 8A, in addition to a road payment area 801, there are background noise areas 803*a*, 803*b*, 803*c*, 803*d*, etc.

Figure 8B:
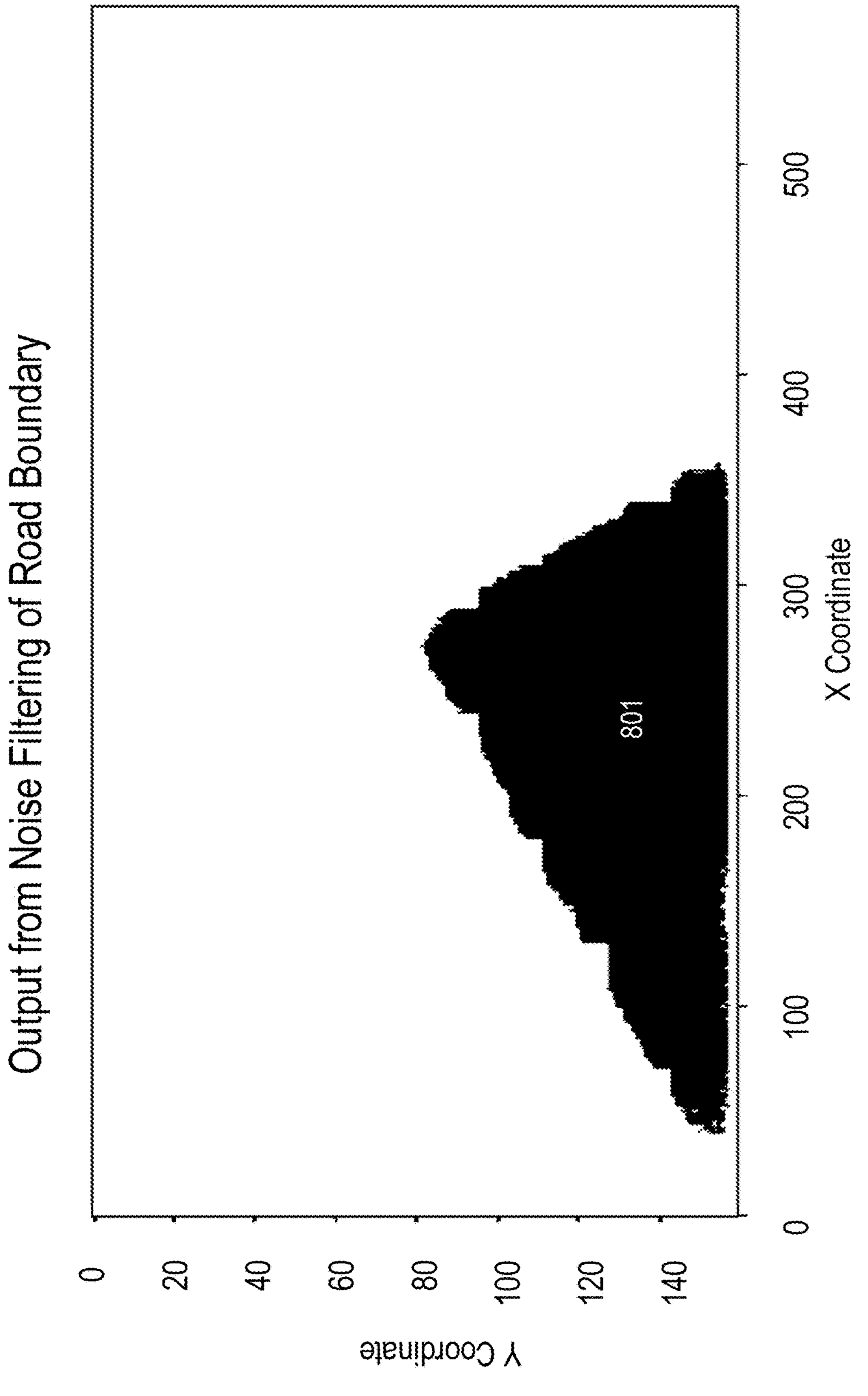
FIG. 8B is a diagram illustrating filtered outputs from a road boundary detection algorithm, according to example embodiment(s)

To filter away such noise, the computer vision system 107 can segment the diagram 800 into equally sized rectangular blocks. The width and height of the rectangles can be selected to ensure that the rectangles cover the entire diagram 800 and do not overlap. Then, for each rectangle, the computer vision system 107 can determine the number of pixels in which a road pavement was detected. If that number falls below a pre-define threshold, the road pavement detections in that rectangle are eliminated. Parametric analysis shows that a threshold of 50 performs good filtering for rectangles that cover around 500 pixels of the diagram 800 (e.g., a threshold of 10%). An example from such a noise filter stride is provided in FIG. 8B. FIG. 8B is a diagram 820 illustrating filtered outputs from a road boundary detection algorithm, according to example embodiment(s). In FIG. 8B, the background noise areas outside of the road payment area 801 were removed.

Figure 9:
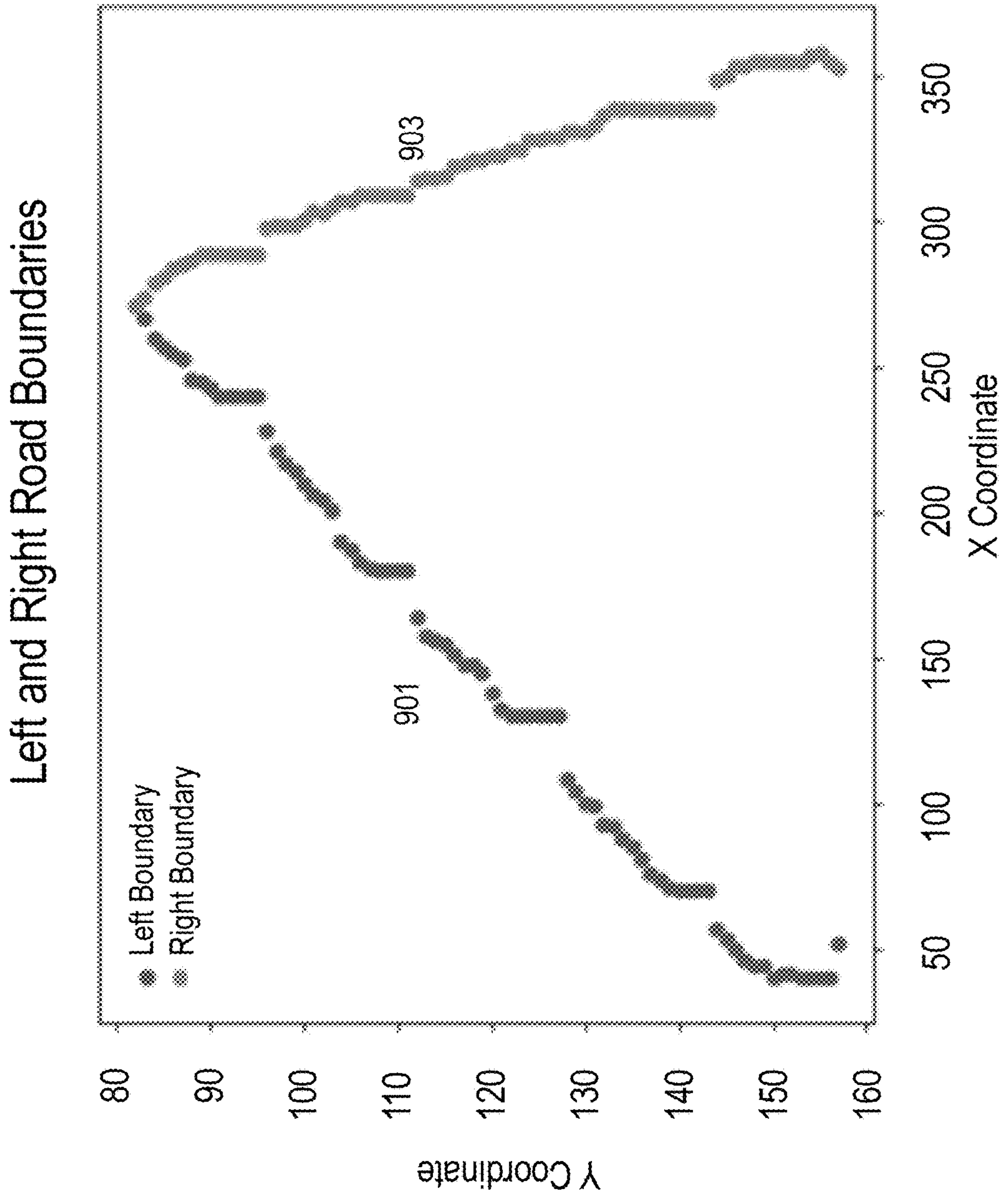
FIG. 9 is a diagram illustrating refined road boundaries, according to example embodiment(s)

In addition, the computer vision system 107 can refine the left and right boundaries of the road by looping over the rows of the filtered road pavement detections in FIG. 8B, and extracting the first and last occurrence of a road pavement detection for each row. The set of first occurrences from all rows represents the left road boundary and the set of last occurrences from all rows represents the right road boundary shown in FIG. 9. FIG. 9 is a diagram 900 illustrating refined road boundaries, according to example embodiment(s). FIG. 9 shows left road boundary data points 901 and right road boundary data points 903 in the image of 1-375 pixel coordinates on the x-axis and 80-160 pixel coordinates on the y-axis.

Next, the computer vision system 107 can fit a piecewise linear function into each of the left and right road boundaries in FIG. 9. Again, the purpose of selecting piecewise linear functions for this task is to account for curvy roads. Then, for each detected object, the computer vision system 107 can compare the x-coordinate of the object bounding box centroid (e.g., of the traffic cone), to the projected x-coordinate of the road boundaries (e.g., using Equation (5)). If the x-coordinate of the object bounding box centroid is within the x-coordinates of the road boundaries, the computer vision system 107 can classify the object as 'On Road'. Otherwise, the object is classifies as "Off Road".

In another embodiment, when the x-coordinate of the object bounding box centroid is not within the x-coordinates of the road boundaries, the computer vision system 107 can take a further validation step by checking if either the left or right lane boundaries intersects with the object bounding box. If an intersection occurs, the computer vision system 107 can compute the intersection area between the object bounding box and the road pavement. For instance, the intersection area can be a triangle or a trapezoid, depending on which edges of the object bounding box intersects the left or right road boundary. When either road boundary intersects perpendicular edges of the object bounding box, the intersection area is a triangle. When it intersects two edges that are parallel, the intersection area is a trapezoid. By way of example, when the intersection area is greater than or equal to 10% of the object bounding box area, the object is classified as "On Road". Otherwise, the object is classifies as "Off Road".

In these embodiments, the computer vision can be used to perform image segmentation to determine a plurality of pixels of the image corresponding to the road surface, for example, via determining a left road boundary and a right road boundary of the road based on the plurality of pixels, and determine the on/off road detection of the one or more objects by comparing a horizontal location of the one or more objects in the object to the left road boundary and the right road boundary at a vertical location of the one or more objects in the image.

In one embodiment, in step 409, the output module 307 can provide the one or more semantic localization features as an output (e.g., the semantic localization feature of the traffic cone on the right side of the road expressed in JavaScript Object Notation (JSON) and text in Table 1).

TABLE 1

{'DEVICE_ID': 'Alice's phone',
'LATITUDE': 41.93143224,
'LONGITUDE': −88.03837523,
'TIME': '5:56:10',
'DATE': '6/20/22',
'DETECTED CONES': 1,
'ROADSIDE': 'Right',
'ACTIVE?': 'N/A'}

In another embodiment, the output module 307 can determine a road incident involving the one or more objects based on the one or more semantic location features, and store the road incident as a data record of a geographic database 113. For example, the one or more objects can include a construction cone, and the road incident can be a construction event.

In one embodiment, the mapping platform 109 can crowd-source semantic location features from vehicles 101 and UEs 103 to determine a road incident involving the one or more objects based on the semantic location features, and store the road incident as a data record of the geographic database 113. Such road incident can involve roadwork(s) detected based on construction area detection, lane closure detection and verification, traffic impact of construction, etc. For instance, the mapping platform 109 can determine a traffic volume based on vehicle count(s), vehicle type(s), etc. The mapping platform 109 can determine a lane-level traffic based on split lane traffic (SLT), ground truth data for lane-level map-matching (LLMM), high-occupancy vehicle (HOV) lane, direction based traffic (DBT), etc. The mapping platform 109 can determine a pedestrian flow based on pedestrian density, direction, etc. In another embodiment, the mapping platform 109 can issue hazard and safety warning(s) based on broken down vehicle(s), vulnerable road user(s) (e.g., cyclists, pedestrians, etc.), etc., as detected via the computer vision system 107.

In one embodiment, the semantic localization features and/or other feature(s) associated with road incidents can be input to train a road incident machine learning model to identify correlations among objects and road incidents, various road incidents, or a combination thereof. In one embodiment, a matrix/table for the road incident machine learning model can include the semantic localization feature(s), object feature(s) (e.g., object type, color, location, etc.), map feature(s) (e.g., road link slope, curvature, FC, speed limit, signs, etc.), vehicle feature(s) (e.g., make, model, characteristics, capabilities-speed range, safety rating, working belts, working airbags, AV/manual mode, etc.), pedestrian features (e.g., ages, medical records, weight, height, pre-existing conditions, a number of nearby pedestrians, activities, destinations, etc.), POI features (e.g., restaurants, hotels, campsites, gas stations, supermarkets, banks, hospitals, museum, etc.), environment features (e.g., visibility, weather, events, traffic, traffic light status, construction status, etc.), etc. For instance, these features can be derived from map data, sensor data, context data of the vehicle 101, pedestrians, environment, etc. In the matrix/table, jaywalking pedestrian, cyclist, bus/train, broken vehicle, traffic cone, lane closure, etc. are listed as example road incident types.

In one embodiment, the training data can include ground truth data taken from historical road incident and impact data. For instance, in a data mining process, features are mapped to ground truth behavior and impact data to form a training instance. A plurality of training instances can form the training data for a road incident machine learning model using one or more machine learning algorithms, such as random forest, decision trees, etc. For instance, the training data can be split into a training set and a test set, e.g., at a ratio of 60%:40%. After evaluating several machine learning models based on the training set and the test set, the machine learning model that produces the highest classification accuracy in training and testing can be used as the behavior and impact machine learning model. In addition, feature selection techniques, such as chi-squared statistic, information gain, gini index, etc., can be used to determine the highest ranked features from the set based on the feature's contribution to classification effectiveness.

In other embodiments, ground truth behavior and impact data can be more specialized than what is prescribed in the matrix/table. For instance, the ground truth could be misplaced traffic cones that caused accidents, traffic jams, etc. In the absence of one or more sets of the features, the model can still make a prediction using the available features.

In one embodiment, the road incident machine learning model can learn from one or more feedback loops. For example, when an accident index (e.g., a dynamic risk assessment value of the potential road incident on a current road link) caused by misplaced traffic cone(s) is computed/estimated to be very high yet no damages (e.g., due to actual road constructions, implementation of mitigation actions, etc.), the road incident machine learning model can learn from the feedback data, via analyzing and reflecting how the high index was generated. The road incident machine learning model can learn the cause(s), for example, based on the map feature(s), the pedestrian wearing a reflective vest, etc., and include new features into the model based on this learning. Alternatively, the road incident machine learning model can blacklist the road links where the deviation is high but no accident occurs.

By analogy, a mitigation action machine learning model that can determine the mitigation actions to be taken by vehicles, POIs, city, pedestrians, etc. prior to or during the road link, based on the features, road incident types, etc. can be used for training in a similar way. In one embodiment, the computer vision system 107 selects respective features such as road topology, vehicle model, vehicle operation settings, traffic patterns, road incident types, etc., to determine the optimal mitigation action(s) to be taken by the vehicles, POIs, city, pedestrians, etc. for different scenarios on different road links. As a result, an additional column can be added in the matrix/table include mitigation actions (for vehicles, POIs, city, pedestrians, etc.). By way of example, the mitigation actions can include speed change, lane change, route change, user vehicle/destination/schedule change, POI operation change, traffic management actions pedestrian awareness, pedestrian behavior change, etc.

In other embodiments, the computer vision system 107 can train the road incident machine learning model and/or the mitigation action machine learning model to select or assign respective weights, correlations, relationships, etc. among the features, to determine optimal action(s) to take for different road incident scenarios on different road links. In one instance, the computer vision system 107 can continuously provide and/or update the machine learning models (e.g., a support vector machine (SVM), neural network, decision tree, etc.) of the computer vision system 107 during training using, for instance, supervised deep convolution networks or equivalents. In other words, the computer vision system 107 trains the machine learning models using the respective weights of the features to most efficiently select optimal action(s) to take for different behavior and impact scenarios on different road links.

In another embodiment, the computer vision system 107 of the mapping platform 109 includes a neural network or other machine learning system(s) to update enhanced features on road links. In one embodiment, the neural network of the computer vision system 107 is a traditional convolutional neural network which consists of multiple layers of collections of one or more neurons (which are configured to process a portion of an input data). In one embodiment, the computer vision system 107 also has connectivity or access over a communication network 115 to the geographic database 113 that can each store map data, the feature data, the outcome data, etc.

In one embodiment, the computer vision system 107 can improve the machine learning models using feedback loops based on, for example, vehicle behavior data and/or feedback data (e.g., from passengers). In one embodiment, the computer vision system 107 can improve the machine learning models using the vehicle behavior data and/or feedback data as training data. For example, the computer vision system 107 can analyze correctly identified road incident data and/or action data, missed road incident data and/or action data, etc. to determine the performance of the machine learning models.

Figure 10A:
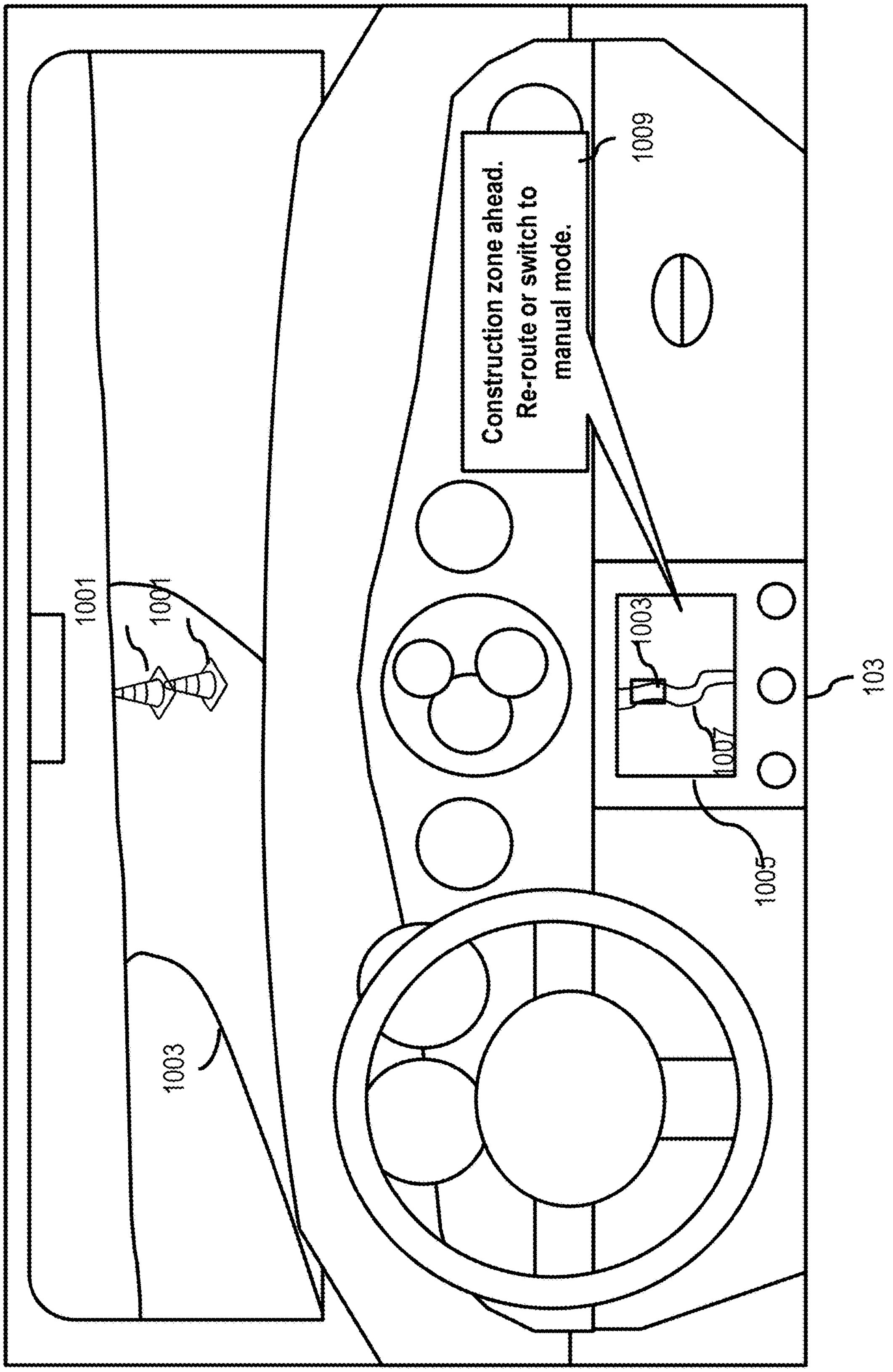
FIGS. 10A-10B are diagrams illustrating example vehicle user interfaces for displaying semantic localization features and/or inferred road incident information, according to example embodiment(s)
Figure 10B:
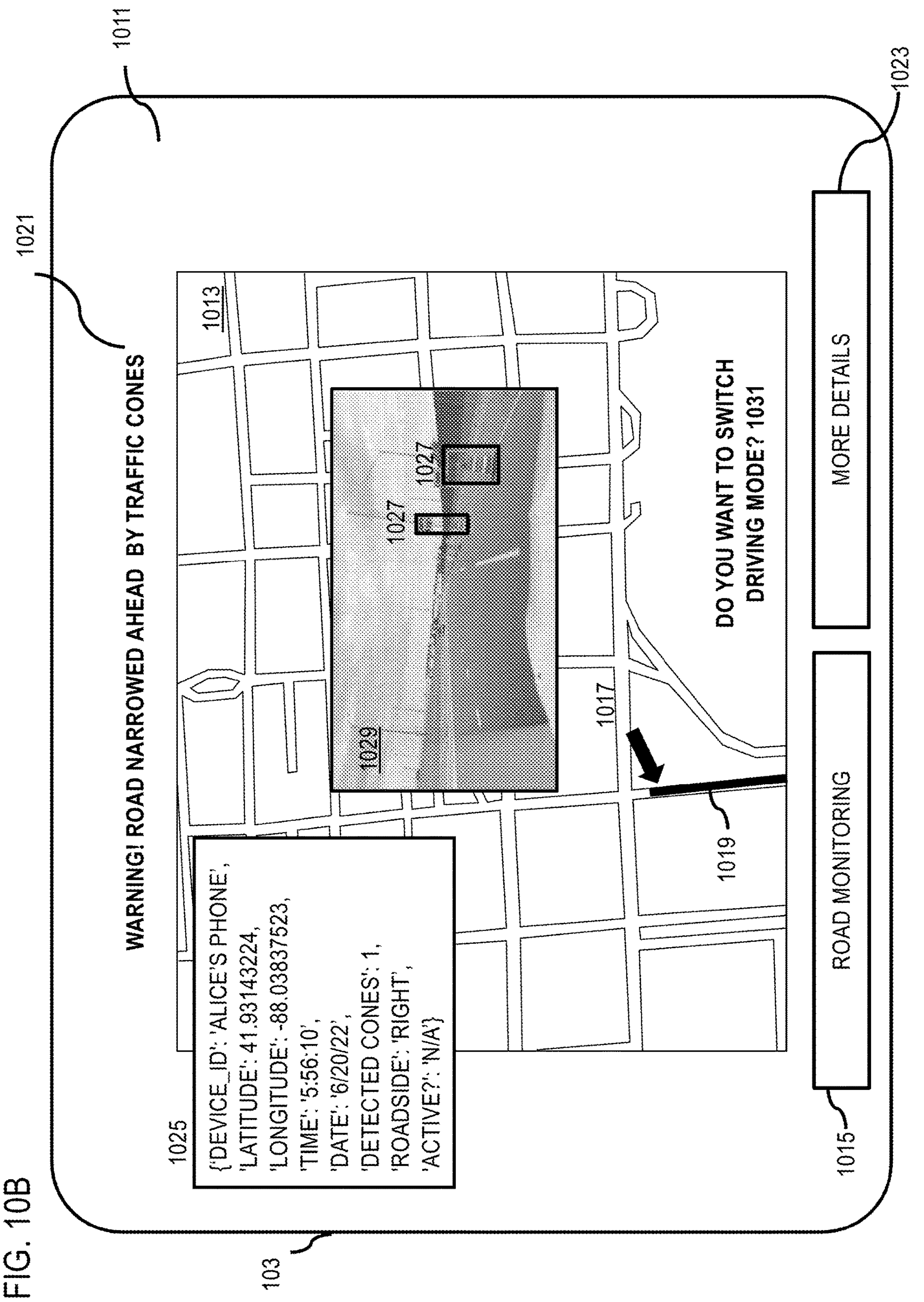

By way of example, FIGS. 10A-10B are diagrams illustrating example vehicle user interfaces for displaying semantic localization features and/or inferred road incident information, according to example embodiment(s).

FIG. 10A is a diagram illustrating a vehicle user interface for detecting and mitigating object(s) and/or inferred road incidents, according to example embodiment(s). As shown, a vehicle 101 is supported by the system 100 that is operated continuously to recommend action(s) to mitigate detected object(s) and/or inferred road incidents. In this example, traffic cones 1001 is determined on a road segment 1003 shown in an example user interface (UI) 1005 generated for a UE 103 (e.g., a mobile device, an embedded navigation system of the vehicle 101, a server of a vehicle fleet operator, a server of a vehicle insurer, etc.). The UI 1001 shows the road segment 1003 on a route 1007. In addition, the system 100 automatically presents a message 1009: "Construction zone ahead. Re-route or switch to manual mode." At the same time, the UE 103 can continuously present a camera feed of captured street objects (e.g., traffic cones) in another UI as follows.

FIG. 10B is a diagram of an example user interface (UI) 1011 (e.g., of a navigation application) capable of displaying semantic localization feature(s) and/or inferred road incident information during navigation, according to example embodiment(s). In this example, the UI 1001 shown is generated for the UE 103 that includes a map 1013, an input 1015 of "Road Monitoring" during navigation. When reaching a road segment 1017 along a route 1019. The system 100 can apply the computer vision system 107 as discussed to detect objects (e.g., traffic cones) thereon, and present on the UI 1011 an alert 1021: "Warning! Road Narrowed ahead by Traffic Cones."

In response to an input 1023 of "More Details," the UI 1011 further presents a pup-up screen 1025 that includes semantic localization feature(s) of the object(s), for example, the JSON and text in Table 1, and an image 1029 of the scene. The system 100 can apply the computer vision system 107 to overlay bounding boxes 1027 and labels of the traffic cones in the image 1029 as in the discussed embodiments. In addition, the system 100 can determine a construction event based on the detected traffic cones and recommend switching from a self-driving mode to a manual mode, and present on the UI 1001 an alert 1031: "Do you want to switch driving mode?" over the map 1013.

Figure 11A:
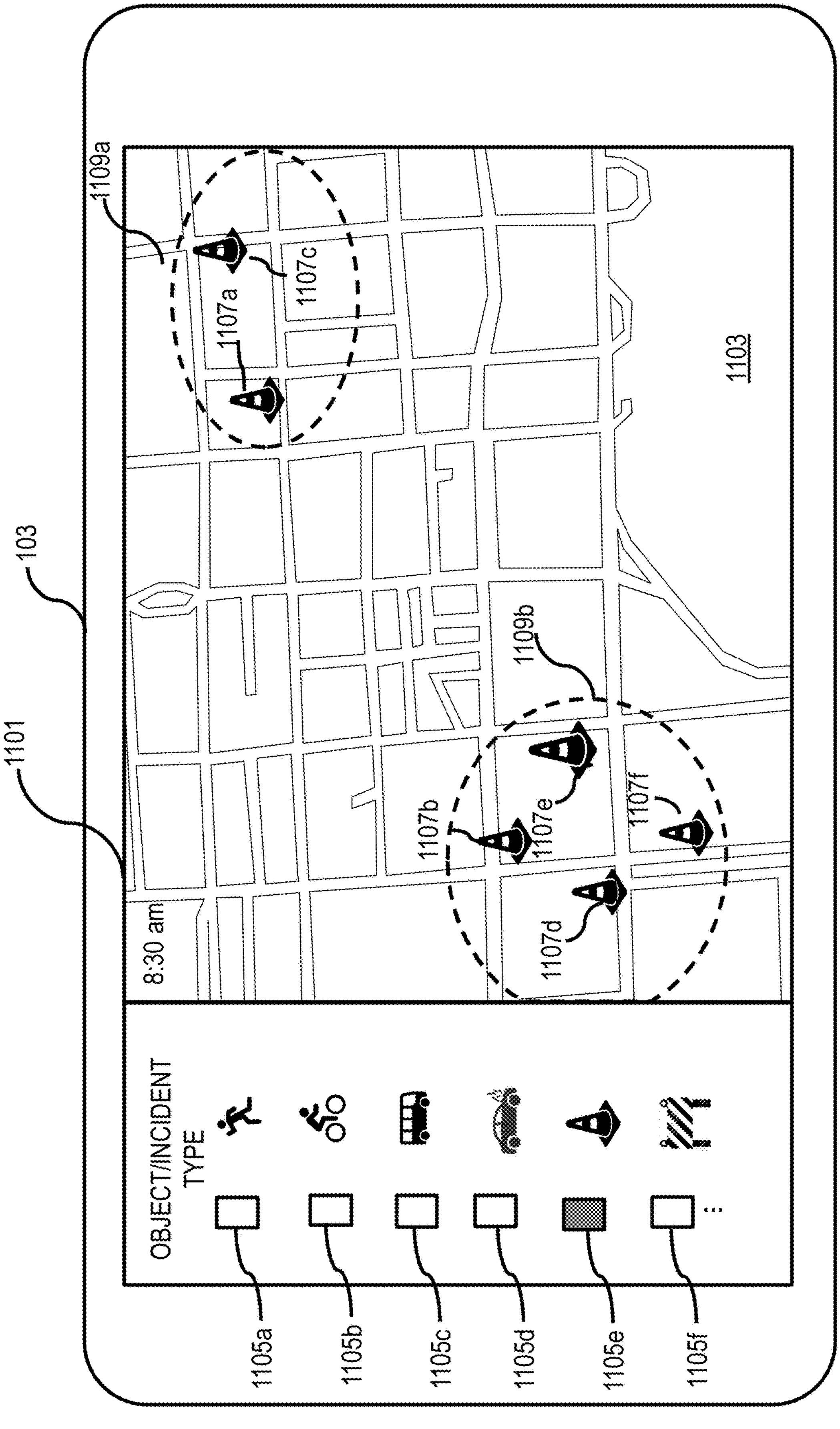
FIGS. 11A-11B are diagrams illustrating example user interfaces for displaying crowd-sourced detected objects and/or inferred road incidents, according to example embodiment(s)
Figure 11B:
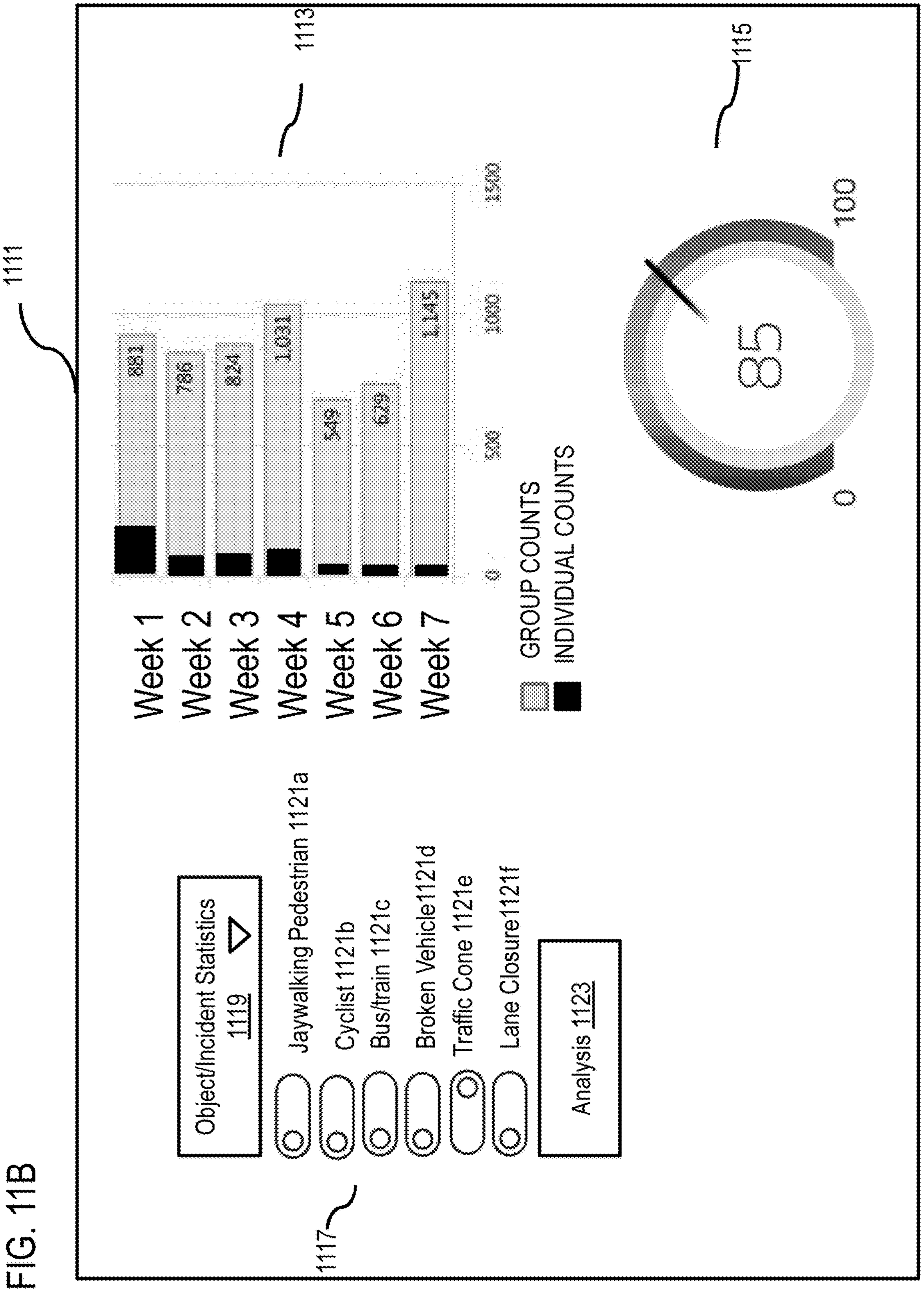

FIGS. 11A-11B are diagrams illustrating example user interfaces for displaying crowd-sourced detected objects and/or inferred road incidents, according to example embodiment(s). Referring to FIG. 11A, in one embodiment, the system 100 can generate a user interface (UI) 1101 (e.g., the application 105) for a UE 103 (e.g., a mobile device, a client terminal, a server of a POI operator, a server of a city authority, etc.) that can allow a user to see crowd-sourced detected object(s) and/or inferred road incident(s) live and/or over time (e.g., an hour, a day, a week, a month, a year, etc.) in an area. The static and/or dynamic crowd-sourced detected object(s) and/or inferred road incidents are available as digital map data, to be presented via a map 1103 upon selection of one or more object/incident types. For instance, the object/incident types in FIG. 11A includes jaywalking pedestrian 1105*a*, cyclist 1105*b*, bus/train 1105*c*, broken vehicle 1105*d*, traffic cone 1105*e*, lane closure 1105*f*, etc. In FIG. 11A, for example, in response to a user selection of the traffic cone 1105*e* at 8:30 am, and the system 100 can determine and present in the map 1103 six traffic cones 1107*a*-1107*f* that make into two clusters 1109*a*, 1109*b*. For instance, the system 100 can alert drivers and recommend the city authority to strategically dispatch police forces into two clusters 1109*a*, 1109*b* to reduce resident-misplaced traffic cones to block parking spaces.

FIG. 11B is a diagram of a user interface associated with detected object and/or inferred road incident statistics, according to example embodiment(s). In this example, the UI 1111 shown may be generated for the UE 103 that depicts a bar chart 1113 and an object/incident scale 1115. For instance, the bar chart 1113 shows weekly group and individual object/incident counts per an area of interest (e.g., city, town, zone, community, district, zip code, map tile, partition, etc.), while the object/incident scale 1115 shows a probability (e.g., an average) that the object/incident count exceeds a baseline value.

The UI 1111 further shows a display setting panel 1117 that includes a setting dropdown menu 1119, a plurality of object/incident statistics switches 1121, and an input 1123 of "Analysis." By way of example, the statistics switches 1121 included jaywalking pedestrian 1121*a*, cyclist 1121*b*, bus/train 1121*c*, broken vehicle 1121*d*, traffic cone 1121*e*, lane closure 1121*f*, etc.

By way of example, the traffic cone 1121*e* is switched on by a user (e.g., a pedestrian, a passenger, a POI operator, a city planner, etc. with different levels of data access based on credentials), and the user further selects the input 1123 of "Analysis". The user can be a human and/or artificial intelligence. As a result, the system 100 analyzes the weekly group and individual object/incident counts using the above-discussed embodiments, calculates the group or individual score as 85, and displays accordingly. Such object/incident analysis can help individual pedestrians, transportation operators, city planners, etc. to understand the situations and/or adapt mitigation action(s) recommended by the system 100.

The above-discussed embodiments can be applied to recommend actions to detect objects and infer road incidents, thereby improving traffic safety, predictability, accessibility of any road links (e.g., motorways, walkways, bicycle paths, train tracks, airplane runways, etc.), etc.

Returning to FIG. 1, it is contemplated the vehicle 101 may be any type of transportation wherein a driver is in control of the vehicle's operation (e.g., an airplane, a drone, a train, a ferry, etc.). In one embodiment, a vehicle 101 (e.g., a regular vehicle, an autonomous or highly assisted driving vehicle, etc.) is able to detect objects (e.g., by object recognition of captured images or videos from a camera sensor) and infer road incidents. The system 100 and/or the vehicle 101 can react differently depending on the object/incident types.

In one embodiment, the vehicle 101 can have many types of sensors. In certain embodiments, the vehicle sensors may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., for detecting objects proximate to the vehicle 101), an audio recorder for gathering audio data (e.g., detecting nearby humans or animals via acoustic signatures such as voices or animal noises), velocity sensors, and the like. In another embodiment, the vehicle sensors may include sensors (such as LiDAR, Radar, Ultrasonic, Infrared, cameras (e.g., for visual ranging), etc. mounted along a perimeter of the vehicle 101) to detect the relative distance of the vehicle 101 from lanes or roadways, the presence of other vehicles, pedestrians, animals, traffic lights, road features (e.g., curves) and any other objects, or a combination thereof. In one scenario, the vehicle sensors 103 may detect weather data, traffic information, or a combination thereof. In one example embodiment, the vehicles 101 may include GPS receivers to obtain geographic coordinates from satellites 123 for determining current location and time. Further, the location can be determined by a triangulation system such as A-GPS, Cell of Origin, or other location extrapolation technologies when cellular or network signals are available. In another example embodiment, the one or more vehicle sensors may provide in-vehicle navigation services.

As shown, the system includes the mapping platform 109 operating alone or in combination with the computer vision system 107 for providing computer-vision-based object detection according to the various embodiments described herein. In one embodiment, the computer vision system 107 of the mapping platform 109 includes or is otherwise associated with one or more machine learning models 111 (e.g., neural networks or other equivalent networks using algorithms such as but not limited to an evolutionary algorithm, reinforcement learning, or equivalent) for performing spatial aggregation.

In one embodiment, the mapping platform 109 has connectivity over the communication network 115 to the services platform 117 that provides one or more services 119 that can use semantic localization feature data and/or road incident data from the computer vision system 107 to perform one or more location-based services. By way of example, the services 119 may be third party services and include but is not limited to mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses semantic localization feature data, road incident data, and/or other data generated by the mapping platform 109 to provide services 119 such as navigation, mapping, other location-based services, etc. to the vehicles 101, UEs 103, and/or applications 105 executing on the UEs 103.

In one embodiment, the mapping platform 109 may be a platform with multiple interconnected components. The mapping platform 109 may include multiple servers, intelligent networking devices, computing devices, components, and corresponding software for providing spatial aggregation for location-based services according to the various embodiments described herein. In addition, it is noted that the mapping platform 109 may be a separate entity of the system 100, a part of the one or more services 119, a part of the services platform 117, or included within components of the vehicles 101 and/or UEs 103.

In one embodiment, content providers 121 may provide content or data (e.g., including geographic data, etc.) to the geographic database 113, mapping platform 109, computer vision system 107, the services platform 117, the services 119, the vehicles 101, the UEs 103, and/or the applications 105 executing on the UEs 103. The content provided may be any type of content, such as semantic localization feature data, road incident data, machine learning models, trip data, offline features, online features, pre-computed routes, map embeddings, map content, textual content, audio content, video content, image content, etc. In one embodiment, the content providers 121 may provide content that may aid in providing spatial aggregation for location-based services according to the various embodiments described herein. In one embodiment, the content providers 121 may also store content associated with the mapping platform 109, computer vision system 107, geographic database 113, services platform 117, services 119, and/or any other component of the system 100. In another embodiment, the content providers 121 may manage access to a central repository of data, and offer a consistent, standard interface to data, such as a repository of the geographic database 113.

In one embodiment, the vehicles 101 and/or UEs 103 may execute software applications 105 to use or access semantic localization feature data, road incident data, and/or data derived therefrom according to the embodiments described herein. By way of example, the applications 105 may also be any type of application that is executable on the vehicles 101 and/or UEs 103, such as autonomous driving applications, mapping applications, location-based service applications, navigation applications, device control applications, content provisioning services, camera/imaging application, media player applications, social networking applications, calendar applications, and the like. In one embodiment, the applications 105 may act as a client for the mapping platform 109 and perform one or more functions associated with providing spatial aggregation for location-based services alone or in combination with the mapping platform 109.

By way of example, the vehicles 101 and/or UEs 103 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 101 and/or UEs 103 can support any type of interface to the user (such as "wearable" circuitry, etc.). In one embodiment, the vehicles 101 and/or UEs 103 may be associated with or be a component of a vehicle or any other device.

In one embodiment, the UEs 103 include a user interface element configured to receive a user input (e.g., a knob, a joystick, a rollerball or trackball-based interface, a touch screen, etc.). In one embodiment, the user interface element could also include a pressure sensor on a screen or a window (e.g., a windshield of a vehicle 101, a heads-up display, etc.), an interface element that enables gestures/touch interaction by a user, an interface element that enables voice commands by a user, or a combination thereof. In one embodiment, the UEs 103 may be configured with various sensors for collecting passenger sensor data and/or context data during operation of the vehicle 101 along one or more roads within the travel network. By way of example, sensors of the UE 103 can be any type of sensor that can detect a passenger's gaze, heartrate, sweat rate or perspiration level, eye movement, body movement, or combination thereof, in order to determine a passenger context or a response to output data. In one embodiment, the UEs 103 may be installed with various applications 105 to support the system 100.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 109, computer vision system 107, services platform 117, services 119, vehicles 101 and/or UEs 103, and/or content providers 121 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 12:
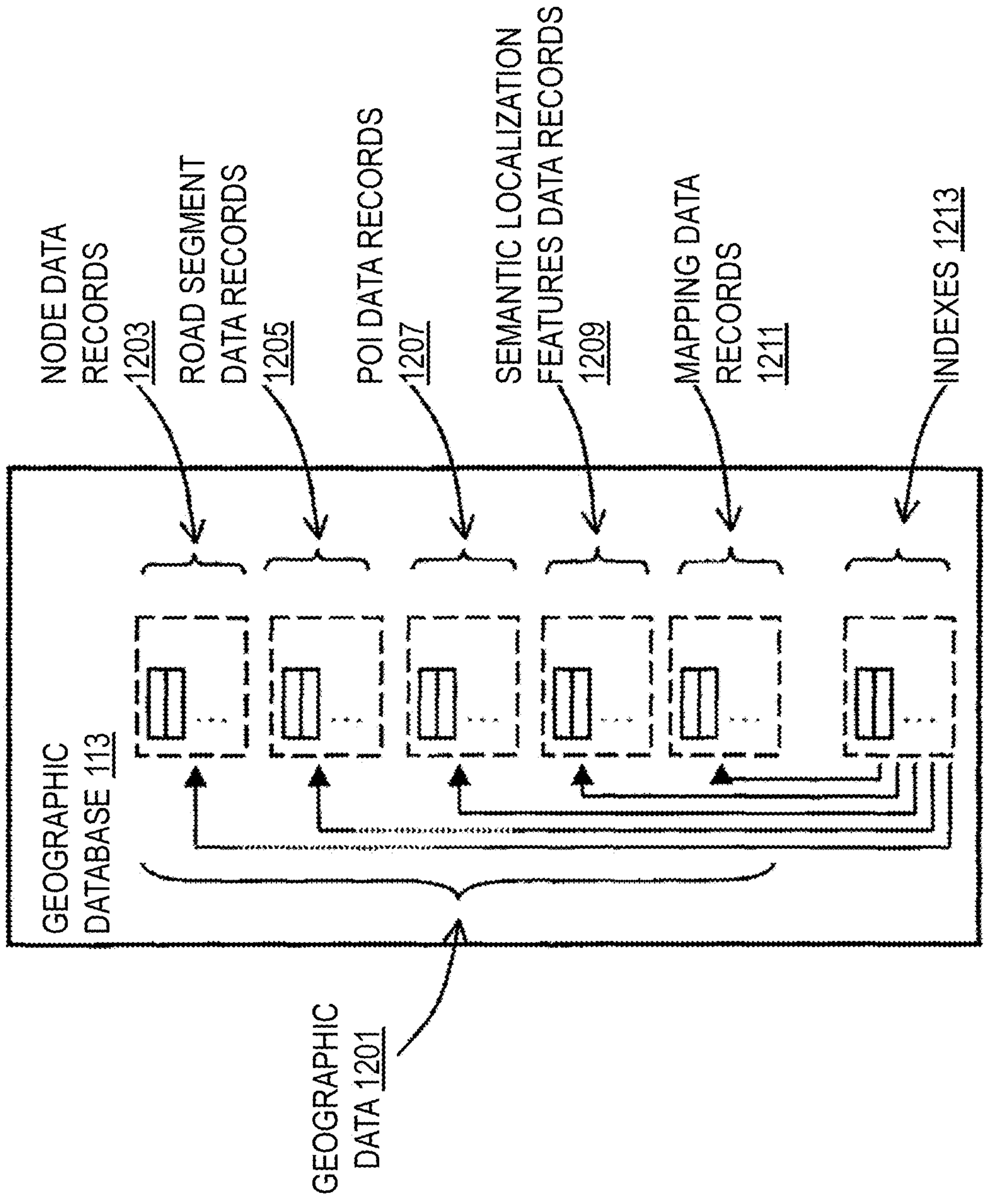
FIG. 12 is a diagram of a geographic database, according to example embodiment(s)

FIG. 12 is a diagram of a geographic database (such as the database 113), according to one embodiment. In one embodiment, the geographic database 113 includes geographic data 1201 used for (or configured to be compiled to be used for) mapping and/or navigation-related services, such as for video odometry based on the parametric representation of lanes include, e.g., encoding and/or decoding parametric representations into lane lines. In one embodiment, the geographic database 113 include high resolution or high definition (HD) mapping data that provide centimeter-level or better accuracy of map features. For example, the geographic database 113 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 1211) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1203, road segment or link data records 1205, POI data records 1207, semantic localization feature data records 1209, mapping data records 1211, and indexes 1213, for example. More, fewer or different data records can be provided. In one embodiment, additional data records (not shown) can include cartographic ("carto") data records, routing data, and maneuver data. In one embodiment, the indexes 1213 may improve the speed of data retrieval operations in the geographic database 113. In one embodiment, the indexes 1213 may be used to quickly locate data without having to search every row in the geographic database 113 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points (such as intersections) corresponding to the respective links or segments of the road segment data records 1205. The road link data records 1205 and the node data records 1203 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1207. The geographic database 113 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city). In one embodiment, certain attributes, such as lane marking data records, mapping data records and/or other attributes can be features or layers associated with the link-node structure of the database.

In one embodiment, the geographic database 113 can also include semantic localization features data records 1209 for storing semantic localization features, other feature data, road incident data, training data, prediction models, annotated observations, computed featured distributions, sampling probabilities, and/or any other data generated or used by the system 100 according to the various embodiments described herein. By way of example, the semantic localization features data records 1209 can be associated with one or more of the node records 1203, road segment records 1205, and/or POI data records 1207 to support localization or visual odometry based on the features stored therein and the corresponding estimated quality of the features. In this way, the records 1209 can also be associated with or used to classify the characteristics or metadata of the corresponding records 1203, 1205, and/or 1207.

In one embodiment, as discussed above, the mapping data records 1211 model road surfaces and other map features to centimeter-level or better accuracy. The mapping data records 1211 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 1211 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 1211 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 1211.

In one embodiment, the mapping data records 1211 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 121 in association with the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicles 101 and/or UEs 103) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a computer-vision-based object detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
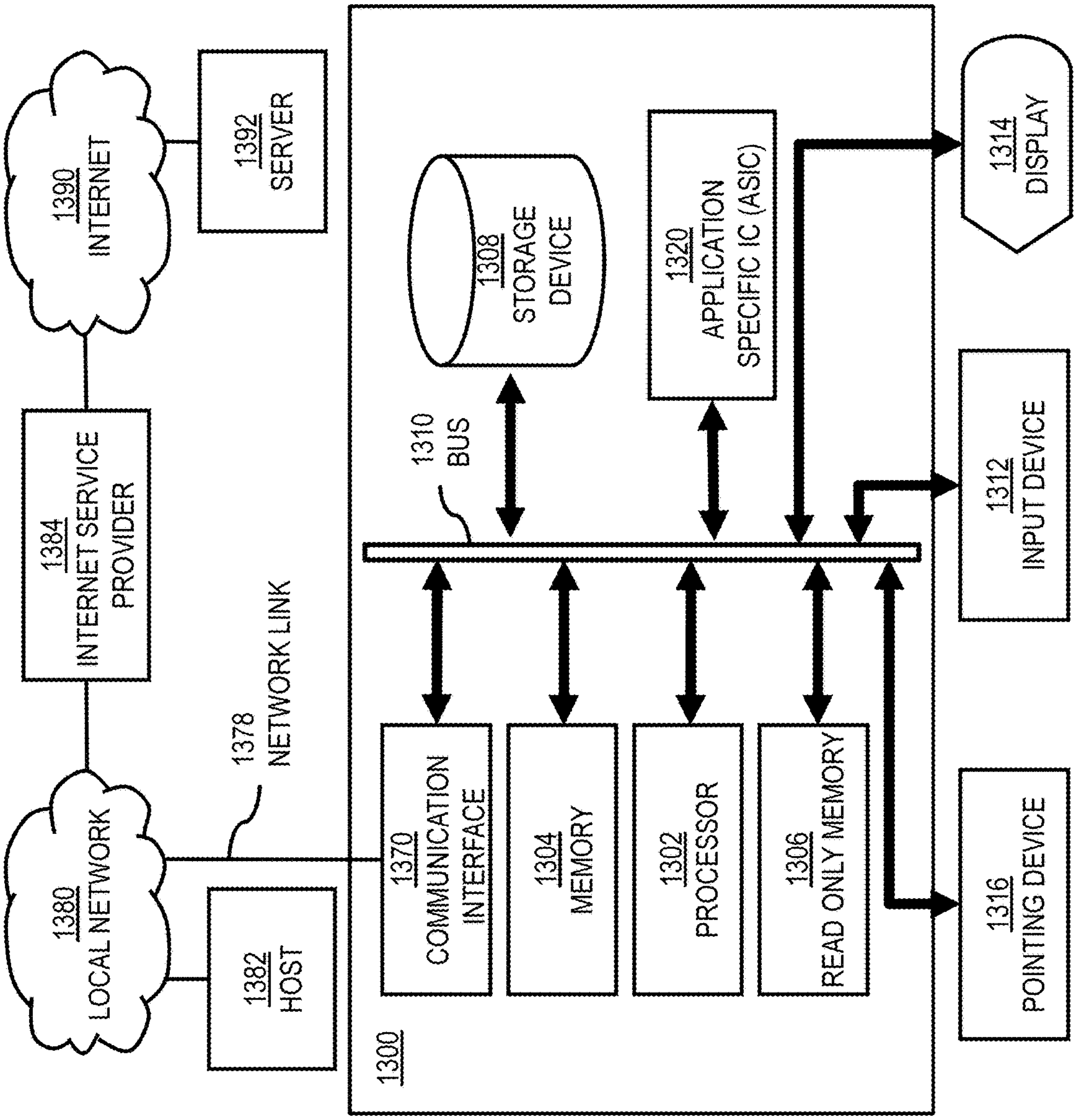
FIG. 13 is a diagram of hardware that can be used to implement an embodiment of the invention, according to example embodiment(s)

FIG. 13 illustrates a computer system 1300 upon which an embodiment of the invention may be implemented. Computer system 1300 is programmed (e.g., via computer program code or instructions) to provide a computer-vision-based object detection as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to computer-vision-based object detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for providing a computer-vision-based object detection. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, which is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, which persists even when the computer system 1300 is turned off or otherwise loses power.

Information, including instructions for providing a computer-vision-based object detection, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, which carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 115 for providing a computer-vision-based object detection.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system can be deployed in various configurations within other computer systems, e.g., host 1382 and server 1392.

FIG. 14 illustrates a chip set 1400 upon which an embodiment of the invention may be implemented. Chip set 1400 is programmed to provide a computer-vision-based object detection as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide a computer-vision-based object detection. The memory 1405 also stores the data associated with or generated by the execution of the inventive steps.

Figure 15:
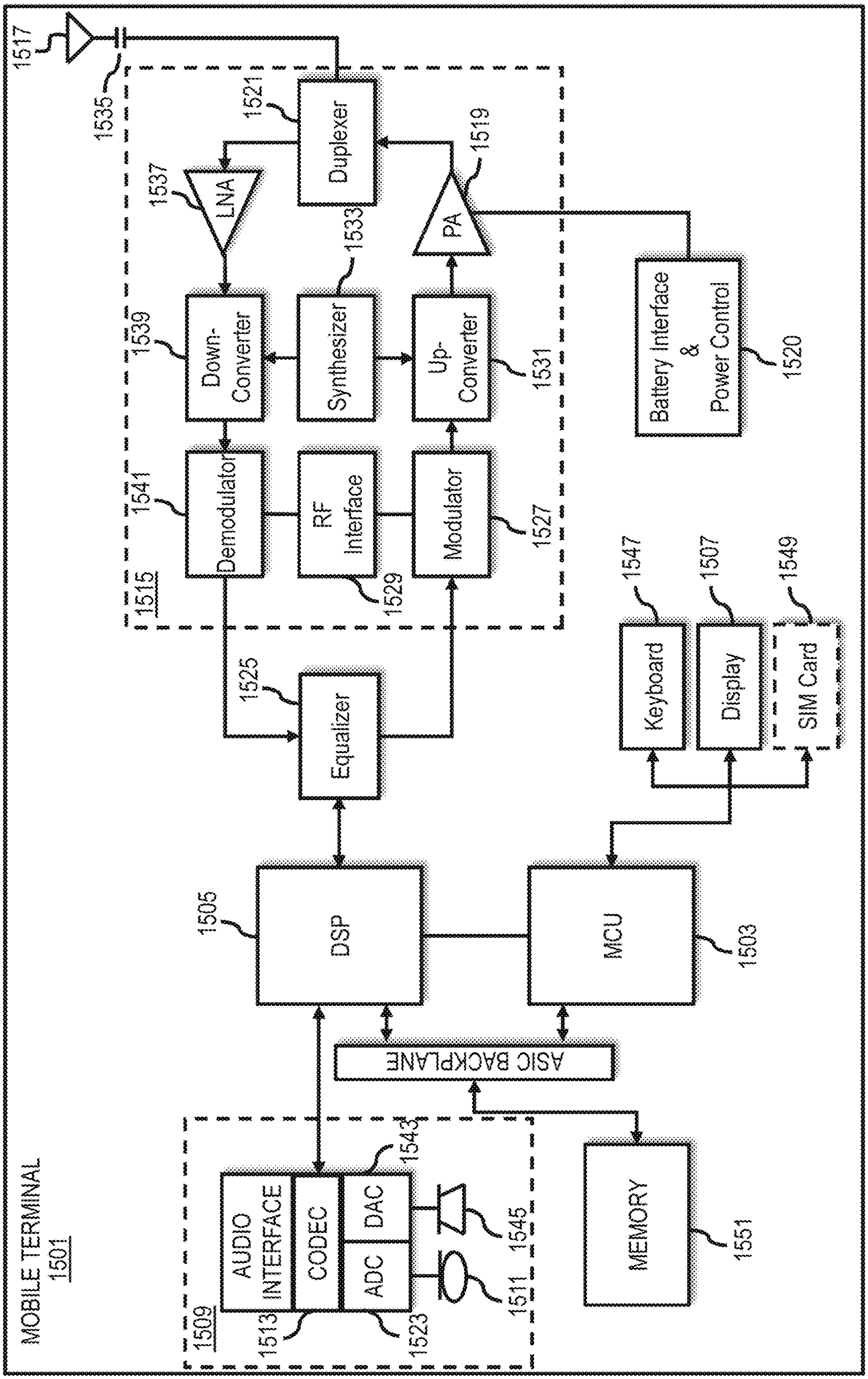
FIG. 15 is a diagram of a mobile terminal (e.g., handset or vehicle or part thereof) that can be used to implement an embodiment.

FIG. 15 is a diagram of exemplary components of a mobile terminal 1501 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to provide a computer-vision-based object detection. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

receiving an image captured from a perspective of a vehicle or a device traveling at street level;

processing the image using computer vision to detect one or more objects, one or more lane markings, a road surface, or a combination thereof depicted in the image;

determining a relative positioning of the one or more objects with respect to the one or more lane markings, the road surface, or a combination thereof;

classifying one or more semantic localization features of the one or more objects based on the relative positioning, wherein each of the one or more semantic localization features comprises a predefined label indicating a relative location of the one or more objects with respect to the one or more lane markings, the road surface, or a combination thereof, distinct from location coordinate data; and providing the one or more semantic localization features as an output, wherein the predefined label is selected from a finite set of categorical location descriptors and serves as a substitute for location coordinate data to simplify data processing for a downstream location-based service by replacing coordinate-based representations of the one or more objects in the output.

2. The method of claim 1, further comprising:

determining a relative size of the one or more objects based on an object pixel size of the one or more objects relative to an image pixel size of the image; and filtering the one or more objects based on the relative size.

3. The method of claim 2, wherein the object pixel size is determined from a size of a bounding box corresponding to the one or more objects as detected by the computer vision.

4. The method of claim 1, wherein the one or more semantic localization features includes a lateral localization of the one or more objects with respect to the vehicle, and wherein the lateral localization indicates that the one or more objects are in a left lane or a right lane relative to a location of the vehicle or the device.

5. The method of claim 4, further comprising:

determining a vertical location of the one or more objects in the image;

projecting a horizontal line from the vertical location to one or more lane boundaries determined from the one or more lane markings; and determining the lateral location of the one or more objects based on an intersection of the horizontal line with the one or more lane boundaries.

6. The method of claim 1, wherein the one or more semantic localization features includes an on/off road detection, and wherein the on/off road detection indicates that the one or more objects are on the road surface detected in the image or off the road surface detected in the image.

7. The method of claim 6, wherein the computer vision is used to perform image segmentation to determine a plurality of pixels of the image corresponding to the road surface, the method further comprising:

determining a left road boundary and a right road boundary of the road based on the plurality of pixels; and determining the on/off road detection of the one or more objects by comparing a horizontal location of the one or more objects in the image to the left road boundary and the right road boundary at a vertical location of the one or more objects in the image.

8. The method of claim 1, wherein the one or more semantic localization features includes an in-lane detection, and wherein the in-lane detection indicates that the one or more objects are in a same lane or not the same lane as a location of the vehicle or the device.

9. The method of claim 8, further comprising:

determining a vertical location of the one or more objects in the image;

projecting a horizontal line from the vertical location to one or more lane boundaries determined from the one or more lane markings; and determining the in-lane detection of the one or more objects based on an intersection of the horizontal line with the one or more lane boundaries.

10. The method of claim 1, further comprising:

determining a road incident involving the one or more objects based on the one or more semantic localization features; and storing the road incident as a data record of a geographic database.

11. The method of claim 10, wherein the one or more objects includes a construction cone, and wherein the road incident is a construction event.

12. The method of claim 1, wherein the computer vision uses an object detection algorithm to detect the one or more objects, uses a spatial neural network to detect the one or more lane markings, uses an image segmentation classifier to detect the road surface; or a combination thereof.

13. An apparatus comprising:

at least one processor; and at least one memory including computer program code for one or more programs, the at least one memory and the computer program code configured to, with the at least one processor, cause the apparatus to perform at least the following:

receive an image captured from a perspective of a vehicle or a device traveling at street level;

process the image using computer vision to detect one or more objects, one or more lane markings, a road surface, or a combination thereof depicted in the image;

determine a relative positioning of the one or more objects with respect to the one or more lane markings, the road surface, or a combination thereof;

classify one or more semantic localization features of the one or more objects based on the relative positioning, wherein each of the one or more semantic localization features comprises a predefined label indicating a relative location of the one or more objects with respect to the one or more lane markings, the road surface, or a combination thereof, distinct from location coordinate data; and provide the one or more semantic localization features as an output, wherein the predefined label is selected from a finite set of categorical location descriptors and serves as a substitute for location coordinate data to simplify data processing for a downstream location-based service by replacing coordinate-based representations of the one or more objects in the output.

14. The apparatus of claim 13, wherein the apparatus is further caused to:

determine a relative size of the one or more objects based on an object pixel size of the one or more objects relative to an image pixel size of the image; and filter the one or more objects based on the relative size.

15. The apparatus of claim 14, wherein the object pixel size is determined from a size of a bounding box corresponding to the one or more objects as detected by the computer vision.

16. The apparatus of claim 13, wherein the one or more semantic localization features includes a lateral localization of the one or more objects with respect to the vehicle, and wherein the lateral localization indicates that the one or more objects are in a left lane or a right lane relative to a location of the vehicle or the device.

17. A non-transitory computer-readable storage medium carrying one or more sequences of one or more instructions which, when executed by one or more processors, cause an apparatus to at least perform the following steps:

receiving an image captured from a perspective of a vehicle or a device traveling at street level;

processing the image using computer vision to detect one or more objects, one or more lane markings, a road surface, or a combination thereof depicted in the image;

determining a relative positioning of the one or more objects with respect to the one or more lane markings, the road surface, or a combination thereof;

classifying one or more semantic localization features of the one or more objects based on the relative positioning, wherein each of the one or more semantic localization features comprises a predefined label indicating a relative location of the one or more objects with respect to the one or more lane markings, the road surface, or a combination thereof, distinct from location coordinate data; and providing the one or more semantic localization features as an output, wherein the predefined label is selected from a finite set of categorical location descriptors and serves as a substitute for location coordinate data to simplify data processing for a downstream location-based service by replacing coordinate-based representations of the one or more objects in the output.

18. The non-transitory computer-readable storage medium of claim 17, wherein the apparatus is caused to further perform:

determining a relative size of the one or more objects based on an object pixel size of the one or more objects relative to an image pixel size of the image; and filtering the one or more objects based on the relative size.

19. The non-transitory computer-readable storage medium of claim 18, wherein the object pixel size is determined from a size of a bounding box corresponding to the one or more objects as detected by the computer vision.

20. The non-transitory computer-readable storage medium of claim 17, wherein the one or more semantic localization features includes a lateral localization of the one or more objects with respect to the vehicle, and wherein the lateral localization indicates that the one or more objects are in a left lane or a right lane relative to a location of the vehicle or the device.

* * * * *